United States Patent
Zhang et al.

(10) Patent No.: US 10,798,699 B2
(45) Date of Patent: *Oct. 6, 2020

(54) PHYSICAL DOWNLINK CONTROL CHANNEL TRANSMISSION METHOD, BASE STATION DEVICE, AND USER EQUIPMENT

(71) Applicant: HUAWEI TECHNOLOGIES CO., LTD., Shenzhen (CN)

(72) Inventors: Xiangdong Zhang, Beijing (CN); Zheng Yu, Beijing (CN); Jinhuan Xia, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/447,932

(22) Filed: Jun. 20, 2019

(65) Prior Publication Data

US 2019/0313387 A1   Oct. 10, 2019

Related U.S. Application Data

(63) Continuation of application No. 15/588,209, filed on May 5, 2017, now Pat. No. 10,349,394, which is a
(Continued)

(51) Int. Cl.
*H04W 72/04* (2009.01)
*H04W 88/02* (2009.01)
(Continued)

(52) U.S. Cl.
CPC ....... *H04W 72/042* (2013.01); *H04W 74/085* (2013.01); *H04W 74/0833* (2013.01); *H04W 88/02* (2013.01); *H04W 88/08* (2013.01)

(58) Field of Classification Search
CPC ........... H04W 72/042; H04W 74/0833; H04W 74/085; H04W 88/02; H04W 88/08
See application file for complete search history.

(56) References Cited

U.S. PATENT DOCUMENTS

2012/0188961 A1   7/2012   Suzuki et al.
2013/0083749 A1   4/2013   Xu et al.
(Continued)

FOREIGN PATENT DOCUMENTS

CN   101742656 A   6/2010
CN   102474885 A   5/2012
(Continued)

OTHER PUBLICATIONS

KT Corp., "Considerations on common control messages", 3GPP TSG RAN WG1 Meeting #78bis, Oct. 6-10, 2014, R1-144251, XP050869880, 3 pages.

*Primary Examiner* — Walli Z Butt
*Assistant Examiner* — Ryan C Kavleski
(74) *Attorney, Agent, or Firm* — Kilpatrick Townsend & Stockton LLP

(57) ABSTRACT

Embodiments of the present disclosure disclose a physical downlink control channel sending method. The method includes: sending configuration information of a first physical downlink control channel on a predefined resource, where the configuration information of the first physical downlink control channel is used to indicate manners of sending and receiving the first physical downlink control channel; and sending the first physical downlink control channel according to the configuration information of the first physical downlink control channel. Correspondingly, the embodiments of the present disclosure further disclose a physical downlink control channel receiving method, a base station device, and user equipment. By using the present disclosure, a physical downlink control channel, especially, an EPDCCH channel, can be transmitted, to resolve a problem of physical downlink control channel transmission caused by the fact that narrowband user equipment cannot receive a broadband PDCCH channel.

16 Claims, 5 Drawing Sheets

Send a random access response message on a predefined resource, where the random access response message carries configuration information of a first physical downlink control channel — S201

Send the first physical downlink control channel according to the configuration information of the first physical downlink control channel — S202

Related U.S. Application Data continuation of application No. PCT/CN2014/090621, filed on Nov. 7, 2014.

(51) Int. Cl.
*H04W 74/08* (2009.01)
*H04W 88/08* (2009.01)

(56) References Cited

U.S. PATENT DOCUMENTS

| | | |
|---|---|---|
| 2013/0083753 A1 | 4/2013 | Lee et al. |
| 2013/0194931 A1 | 8/2013 | Lee et al. |
| 2013/0242882 A1 | 9/2013 | Blankenship et al. |
| 2014/0003349 A1 | 1/2014 | Kang et al. |
| 2014/0078980 A1 | 3/2014 | Frenne et al. |
| 2014/0355539 A1* | 12/2014 | Yang ............... H04L 1/1893 370/329 |
| 2015/0117354 A1 | 4/2015 | Dai et al. |
| 2015/0264718 A1* | 9/2015 | Yu .................... H04W 72/02 370/329 |
| 2016/0295437 A1* | 10/2016 | Zhang ............. H04W 72/1289 |
| 2016/0338110 A1* | 11/2016 | Wang ................ H04L 1/0025 |
| 2017/0353282 A1 | 12/2017 | Park et al. |

FOREIGN PATENT DOCUMENTS

| | | |
|---|---|---|
| CN | 103391563 A | 11/2013 |
| CN | 103999528 A | 8/2014 |
| CN | 104081709 A | 10/2014 |
| EP | 2683098 A2 | 1/2014 |
| EP | 3013010 A1 | 4/2016 |
| JP | 2011035861 A | 2/2011 |
| JP | 2014511056 A | 5/2014 |
| KR | 20090111250 A | 10/2009 |
| KR | 20130119484 A | 10/2013 |
| KR | 101927322 B1 | 12/2018 |
| WO | 2013049768 A1 | 4/2013 |
| WO | 2013112972 A1 | 8/2013 |
| WO | 2014131017 A1 | 8/2014 |

* cited by examiner

| | | | | | | | |
|---|---|---|---|---|---|---|---|

| R | Timing Advance Command | Oct 1 |
|---|---|---|
| Timing Advance Command | UL Grant | Oct 2 |
| UL Grant | | Oct 3 |
| UL Grant | | Oct 4 |
| Temporary C-RNTI | | Oct 5 |
| Temporary C-RNTI | | Oct 6 |

R: Reserved
Timing Advance Command: Timing advance command
UL Grant: Uplink grant
Temporary C-RNTI: Cell Radio Network Temporary Identifier, Cell radio network temporary identifier
Oct: Byte

PHYSICAL DOWNLINK CONTROL CHANNEL TRANSMISSION METHOD, BASE STATION DEVICE, AND USER EQUIPMENT

CROSS-REFERENCE TO RELATED APPLICATIONS

This application is a continuation of U.S. patent application Ser. No. 15/588,209, filed on May 5, 2017, which is a continuation of International Application No. PCT/CN2014/090621, filed on Nov. 7, 2014, All of the afore-mentioned patent applications are hereby incorporated by reference in their entireties.

TECHNICAL FIELD

The present application relates to the field of wireless communications technologies, and in particular, to a physical downlink control channel transmission method, a base station device, and user equipment.

BACKGROUND

The Internet of things (The Internet of Things) refers to: Obtain information about a physical world by deploying various devices having perception, calculation, execution, and communication capabilities, and implement information transmission, orchestration, and processing by using a network, to further implement a network interconnecting people and things and interconnecting things. With continuous development of the Internet of things technologies, research on how to bear an application of the Internet of things by using a mobile communications network has been started currently. In this research, to reduce device costs and satisfy a requirement for low consumption, an operating bandwidth of a device needs to be reduced. For example, bandwidths of a radio frequency and a baseband of the device are reduced to 1.4 MHz. User equipment whose operating bandwidth is reduced is referred to as narrowband user equipment.

According to an existing protocol, a base station in a communications system transmit scheduling information to user equipment by using a PDCCH (Physical Downlink Control Channel) or an EPDCCH (Enhanced Physical Downlink Control Channel). The scheduling information is used to indicate a transmission manner of to-be-transmitted data, for example, a used time frequency resource, or a used modulation and coding scheme. In the EPDCCH channel, a CSS (Common Search Space) used to schedule a common message is not defined, and only a USS (UE specific Search Space) used to schedule user specific data is defined. In addition, configuration information of the USS that is defined in the EPDCCH and that is used to schedule user specific data is transmitted by using RRC (Radio Resource Control) signaling scheduled by using a PDCCH.

However, if a system bandwidth is greater than an operating bandwidth of narrowband user equipment, the narrowband user equipment cannot receive a PDCCH channel of a system because the PDCCH channel may be mapped and distributed through a range of the entire system bandwidth. Furthermore, the narrowband user equipment cannot receive the configuration information of the USS in the EPDCCH by receiving the RRC signaling according to the existing protocol, and cannot configure the USS in the EPDCCH. Consequently, no physical downlink control channel is available for the narrowband user equipment, and data cannot be scheduled or transmitted.

Therefore, for a scenario in which a system bandwidth is greater than an operating bandwidth of narrowband user equipment, how to transmit a physical downlink control channel is a problem urgently to be resolved.

SUMMARY

Embodiments of the present disclosure provide a physical downlink control channel transmission method, a base station device, and user equipment, to transmit a physical downlink control channel, especially an EPDCCH channel, so as to resolve a problem of physical downlink control channel transmission caused by the fact that narrowband user equipment cannot receive a broadband PDCCH channel.

A first aspect of the embodiments of the present disclosure provides a physical downlink control channel sending method, including:

sending configuration information of a first physical downlink control channel on a predefined resource, where the configuration information of the first physical downlink control channel is used to indicate manners of sending and receiving the first physical downlink control channel; and sending the first physical downlink control channel according to the configuration information of the first physical downlink control channel.

In a first possible implementation manner of the first aspect, the sending configuration information of a first physical downlink control channel on a predefined resource includes:

sending a random access response message on the predefined resource, where the random access response message carries the configuration information of the first physical downlink control channel.

With reference to the possible implementation manner of the first aspect, in a second possible implementation manner, the sending configuration information of a first physical downlink control channel on a predefined resource includes:

sending scheduling information of a random access response message on the predefined resource, where the scheduling information of the random access response message is used to indicate manners of sending and receiving the random access response message; and sending the random access response message according to the scheduling information of the random access response message, where the random access response message carries the configuration information of the first physical downlink control channel.

With reference to the first aspect or the second possible implementation manner of the first aspect, in a third possible implementation manner, the sending scheduling information of a random access response message on the predefined resource includes:

determining a common search space on the predefined resource; and sending, in the common search space, a second physical downlink control channel used to schedule the random access response message, where the second physical downlink control channel carries the scheduling information of the random access response message.

With reference to the first aspect or the first, or the second, or the third possible implementation manner of the first aspect, in a fourth possible implementation manner, the sending a random access response message, where the random access response message carries the configuration information of the first physical downlink control channel includes:

sending the random access response message, and adding indication information to the random access response message, where the indication information includes scheduling information of a random access contention resolution message, and the scheduling information of the random access contention resolution message is used to indicate manners of sending and receiving the random access contention resolution message; and sending the random access contention resolution message, where the random access contention resolution message carries the configuration information of the first physical downlink control channel; or sending the random access response message, and adding indication information to the random access response message, where the indication information includes configuration information of a third physical downlink control channel, the configuration information of the third physical downlink control channel is used to indicate manners of sending and receiving the third physical downlink control channel, the third physical downlink control channel is used to transmit scheduling information of a random access contention resolution message, the scheduling information of the random access contention resolution message is used to indicate manners of sending and receiving the random access contention resolution message, and the configuration information of the third physical downlink control channel includes configuration information of a common search space in the third physical downlink control channel, and/or configuration information of a user equipment specific search space in a physical downlink control resource of the third physical downlink control channel; and sending the random access contention resolution message, where the random access contention resolution message carries the configuration information of the first physical downlink control channel.

With reference to the first aspect or the fourth possible implementation manner of the first aspect, in a fifth possible implementation manner, the adding indication information to the random access response message includes:

adding a new field to the random access response message, where the new field includes the indication information; or re-explaining an existing field in the random access response message, and writing the indication information into the existing field that is re-explained.

With reference to the first aspect or the first or the second possible implementation manner of the first aspect, in a sixth possible implementation manner, that the random access response message carries the configuration information of the first physical downlink control channel includes:

adding a new field to the random access response message, where the new field includes the configuration information of the first physical downlink control channel; or re-explaining an existing field in the random access response message, and writing the configuration information of the first physical downlink control channel into the existing field that is re-explained.

With reference to the first aspect or the first possible implementation manner of the first aspect, in a seventh possible implementation manner, the first physical downlink control channel is a physical downlink control channel used to schedule a random access contention resolution message.

With reference to the possible implementation manner of the first aspect, in an eighth possible implementation manner, the sending configuration information of a first physical downlink control channel on a predefined resource includes:

sending, on the predefined resource, a data channel carrying the configuration information of the first physical downlink control channel, where the data channel is sent in an unscheduled manner.

With reference to the first possible implementation manner, in a ninth possible implementation manner, the sending configuration information of a first physical downlink control channel on a predefined resource includes:

sending a fourth physical downlink control channel on the predefined resource, and adding the configuration information of the first physical downlink control channel to the fourth physical downlink control channel; or sending a fourth physical downlink control channel on the predefined resource; and sending, according to the fourth physical downlink control channel, a message carrying the configuration information of the first physical downlink control channel.

With reference to the possible implementation manner of the first aspect, in a tenth possible implementation manner, the predefined resource is a part or all of a physical downlink control channel resource, the physical downlink control channel resource is a set of a resource to which a physical downlink control channel is mapped, and a quantity of the physical downlink control channel resources is one or more.

With reference to any one of the first aspect or the first to the tenth possible implementation manners of the first aspect, in an eleventh possible implementation manner, the predefined resource is determined by using a preset rule; and/or notified by using a higher layer; or one or more resources are configured by using a higher layer, and the predefined resource is determined from the one or more resources by using a predefined rule.

With reference to the possible implementation manner of the first aspect, in a twelfth possible implementation manner, the preset rule includes:

the predefined resource is determined according to a quantity of physical resource blocks in the predefined resource, and the predefined resource includes one or more physical resource blocks.

With reference to any one of the first aspect or the first to the twelfth possible implementation manners of the first aspect, in a thirteenth possible implementation manner, the predefined resource includes a predefined time frequency resource.

With reference to any one of the first aspect or the first to the thirteenth possible implementation manners of the first aspect, in a fourteenth possible implementation manner, the predefined resource is a part of a predefined narrowband resource, and the first physical downlink control channel is a part of the predefined resource on the predefined narrowband resource, or is a part of the predefined resource on another narrowband resource that is not predefined.

With reference to any one of the first aspect or the first to the fourteenth possible implementation manners of the first aspect, in a fifteenth possible implementation manner, the configuration information of the first physical downlink control channel includes configuration information of a common search space in the first physical downlink control channel, and/or configuration information of a user equipment specific search space in the first physical downlink control channel.

A second aspect of the embodiments of the present disclosure provides a physical downlink control channel receiving method, including:

receiving configuration information of a first physical downlink control channel on a predefined resource, where the configuration information of the first physical downlink control channel is used to indicate manners of sending and receiving the first physical downlink control channel; and receiving the first physical downlink control channel according to the configuration information of the first physical downlink control channel.

In a first possible implementation manner of the second aspect, the receiving configuration information of a first physical downlink control channel on a predefined resource includes:

receiving a random access response message on the predefined resource, and obtaining the configuration information of the first physical downlink control channel carried in the random access response message.

With reference to the possible implementation manner of the second aspect, in a second possible implementation manner, the sending configuration information of a first physical downlink control channel on a predefined resource includes:

receiving scheduling information of a random access response message on the predefined resource, where the scheduling information of the random access response message is used to indicate manners of sending and receiving the random access response message; and receiving the random access response message according to the scheduling information of the random access response message, and obtaining the configuration information of the first physical downlink control channel carried in the random access response message.

With reference to the second aspect or the second possible implementation manner of the second aspect, in a third possible implementation manner, the receiving scheduling information of a random access response message on the predefined resource includes:

determining a common search space on the predefined resource; and receiving, in the common search space, a second physical downlink control channel used to schedule the random access response message, and obtaining the scheduling information that is of the random access response message and that is carried in the second physical downlink control channel.

With reference to the second aspect or the first, or the second, or the third possible implementation manner of the second aspect, in a fourth possible implementation manner, the obtaining the configuration information of the first physical downlink control channel carried in the random access response message includes:

receiving the random access response message, and obtaining indication information carried in the random access response message, where the indication information includes scheduling information of a random access contention resolution message, and the scheduling information of the random access contention resolution message is used to indicate manners of sending and receiving the random access contention resolution message; and receiving the random access contention resolution message according to the scheduling information of the random access contention resolution message, and obtaining the configuration information of the first physical downlink control channel carried in the random access contention resolution message; or receiving the random access response message, and obtaining indication information carried in the random access response message, where the indication information includes configuration information of a third physical downlink control channel, the configuration information of the third physical downlink control channel is used to indicate manners of sending and receiving the third physical downlink control channel, the third physical downlink control channel is used to transmit scheduling information of a random access contention resolution message, the scheduling information of the random access contention resolution message is used to indicate manners of sending and receiving the random access contention resolution message, and the configuration information of the third physical downlink control channel includes configuration information of a common search space in the third physical downlink control channel, and/or configuration information of a user equipment specific search space in a physical downlink control resource of the third physical downlink control channel; and receiving the random access contention resolution message according to the scheduling information of the random access contention resolution message, and obtaining the configuration information of the first physical downlink control channel carried in the random access contention resolution message.

With reference to the second aspect or the fourth possible implementation manner of the second aspect, in a fifth possible implementation manner, the indication information is added by a base station device to the random access response message in the following manner:

adding a new field to the random access response message, where the new field includes the indication information; or re-explaining an existing field in the random access response message, and writing the indication information into the existing field that is re-explained.

With reference to the second aspect or the first or the second possible implementation manner of the second aspect, in a sixth possible implementation manner, that the random access response message carries the configuration information of the first physical downlink control channel includes:

adding a new field to the random access response message, where the new field includes the configuration information of the first physical downlink control channel; or re-explaining an existing field in the random access response message, and writing the configuration information of the first physical downlink control channel into the existing field that is re-explained.

With reference to the second aspect or the first possible implementation manner of the second aspect, in a seventh possible implementation manner, the first physical downlink control channel is a physical downlink control channel used to schedule a random access contention resolution message.

With reference to the possible implementation manner of the second aspect, in an eighth possible implementation manner, the sending configuration information of a first physical downlink control channel on a predefined resource includes:

receiving, on the predefined resource, a data channel carrying the configuration information of the first physical downlink control channel, and obtaining the configuration information of the first physical downlink control channel, where the data channel is sent in an unscheduled manner.

With reference to the possible implementation manner of the second aspect, in a ninth possible implementation manner, the sending configuration information of a first physical downlink control channel on a predefined resource includes:

receiving a fourth physical downlink control channel on the predefined resource, and obtaining the configuration information of the first physical downlink control channel carried in the fourth physical downlink control channel; or receiving a fourth physical downlink control channel on the predefined resource; and receiving, according to the fourth physical downlink control channel, a message carrying the configuration information of the first physical downlink control channel, and obtaining the first physical downlink control channel.

With reference to the possible implementation manner of the second aspect, in a tenth possible implementation manner, the predefined resource is a part or all of a physical downlink control channel resource, the physical downlink control channel resource is a set of a resource to which a physical downlink control channel is mapped, and a quantity of the physical downlink control channel resources is one or more.

With reference to any one of the second aspect or the first to the tenth possible implementation manners of the second aspect, in an eleventh possible implementation manner, the predefined resource is determined by using a preset rule; and/or notified by using a higher layer; or one or more resources are configured by using a higher layer, and the predefined resource is determined from the one or more resources by using a predefined rule.

With reference to the possible implementation manner of the second aspect, in a twelfth possible implementation manner, the preset rule includes:

the predefined resource is determined according to a quantity of physical resource blocks in the predefined resource, and the predefined resource includes one or more physical resource blocks.

With reference to any one of the second aspect or the first to the twelfth possible implementation manners of the second aspect, in a thirteenth possible implementation manner, the predefined resource includes a predefined time frequency resource.

With reference to any one of the second aspect or the first to the thirteenth possible implementation manners of the second aspect, in a fourteenth possible implementation manner, the predefined resource is a part of a predefined narrowband resource, and the first physical downlink control channel is a part of the predefined resource on the predefined narrowband resource, or is a part of the predefined resource on another narrowband resource that is not predefined.

With reference to any one of the second aspect or the first to the fourteenth possible implementation manners of the second aspect, in a fifteenth possible implementation manner, the configuration information of the first physical downlink control channel includes configuration information of a common search space in the first physical downlink control channel, and/or configuration information of a user equipment specific search space in the first physical downlink control channel.

A third aspect of the embodiments of the present disclosure provides a base station device, including:

a configuration information sending module, configured to send configuration information of a first physical downlink control channel on a predefined resource, where the configuration information of the first physical downlink control channel is used to indicate manners of sending and receiving the first physical downlink control channel; and a control channel sending module, configured to send the first physical downlink control channel according to the configuration information of the first physical downlink control channel.

In a first possible implementation manner of the third aspect, the configuration information sending module is specifically configured to send a random access response message on the predefined resource, where the random access response message carries the configuration information of the first physical downlink control channel.

With reference to the possible implementation manner of the third aspect, in a second possible implementation manner, the configuration information sending module is specifically configured to:

send scheduling information of a random access response message on the predefined resource, where the scheduling information of the random access response message is used to indicate manners of sending and receiving the random access response message; and send the random access response message according to the scheduling information of the random access response message, where the random access response message carries the configuration information of the first physical downlink control channel.

With reference to the third aspect or the second possible implementation manner of the third aspect, in a third possible implementation manner, an operation of sending, by the configuration information sending module, the scheduling information of the random access response message on the predefined resource, where the scheduling information of the random access response message is used to indicate the manners of sending and receiving the random access response message is specifically:

determining a common search space on the predefined resource; and sending, in the common search space, a second physical downlink control channel used to schedule the random access response message, where the second physical downlink control channel carries the scheduling information of the random access response message.

With reference to the third aspect or the first, or the second, or the third possible implementation manner of the third aspect, in a fourth possible implementation manner, an operation of sending, by the configuration information sending module, the random access response message, where the random access response message carries the configuration information of the first physical downlink control channel is specifically:

sending the random access response message, and adding indication information to the random access response message, where the indication information includes scheduling information of a random access contention resolution message, and the scheduling information of the random access contention resolution message is used to indicate manners of sending and receiving the random access contention resolution message; and sending the random access contention resolution message, where the random access contention resolution message carries the configuration information of the first physical downlink control channel; or sending the random access response message, and adding indication information to the random access response message, where the indication information includes configuration information of a third physical downlink control channel, the configuration information of the third physical downlink control channel is used to indicate manners of sending and receiving the third physical downlink control channel, the third physical downlink control channel is used to transmit scheduling information of a random access contention resolution message, the scheduling information of the random access contention resolution message is used to indicate manners of sending and receiving the random access contention resolution message, and the configuration information of the third physical downlink control channel includes configuration information of a common search space in the third physical downlink control channel, and/or configuration information of a user equipment specific search space in a physical downlink control resource of the third physical downlink control channel; and sending the random access contention resolution message, where the random access contention resolution message carries the configuration information of the first physical downlink control channel.

With reference to the third aspect or the fourth possible implementation manner of the third aspect, in a fifth possible implementation manner, an operation of adding, by the configuration information sending module, the indication information to the random access response message is specifically:

adding a new field to the random access response message, where the new field includes the indication information; or re-explaining an existing field in the random access response message, and writing the indication information into the existing field that is re-explained.

With reference to the third aspect or the first or the second possible implementation manner of the third aspect, in a sixth possible implementation manner, that the random access response message carries the configuration information of the first physical downlink control channel includes:

adding a new field to the random access response message, where the new field includes the configuration information of the first physical downlink control channel; or re-explaining an existing field in the random access response message, and writing the configuration information of the first physical downlink control channel into the existing field that is re-explained.

With reference to the third aspect or the first possible implementation manner of the third aspect, in a seventh possible implementation manner, the first physical downlink control channel is a physical downlink control channel used to schedule a random access contention resolution message.

With reference to the possible implementation manner of the third aspect, in an eighth possible implementation manner, the configuration information sending module is specifically configured to send, on the predefined resource, a data channel carrying the configuration information of the first physical downlink control channel, where the data channel is sent in an unscheduled manner.

With reference to the possible implementation manner of the third aspect, in a ninth possible implementation manner, the configuration information sending module is specifically configured to:

send a fourth physical downlink control channel on the predefined resource, and add the configuration information of the first physical downlink control channel to the fourth physical downlink control channel; or send a fourth physical downlink control channel on the predefined resource; and send, according to the fourth physical downlink control channel, a message carrying the configuration information of the first physical downlink control channel.

With reference to the possible implementation manner of the third aspect, in a tenth possible implementation manner, the predefined resource is a part or all of a physical downlink control channel resource, the physical downlink control channel resource is a set of a resource to which a physical downlink control channel is mapped, and a quantity of the physical downlink control channel resources is one or more.

With reference to any one of the third aspect or the first to the tenth possible implementation manners of the third aspect, in an eleventh possible implementation manner, the predefined resource is determined by using a preset rule; and/or notified by using a higher layer; or one or more resources are configured by using a higher layer, and the predefined resource is determined from the one or more resources by using a predefined rule.

With reference to the possible implementation manner of the third aspect, in a twelfth possible implementation manner, the preset rule includes:

the predefined resource is determined according to a quantity of physical resource blocks in the predefined resource, and the predefined resource includes one or more physical resource blocks.

With reference to any one of the third aspect or the first to the twelfth possible implementation manners of the third aspect, in a thirteenth possible implementation manner, the predefined resource includes a predefined time frequency resource.

With reference to any one of the third aspect or the first to the thirteenth possible implementation manners of the third aspect, in a fourteenth possible implementation manner, the predefined resource is a part of a predefined narrowband resource, and the first physical downlink control channel is a part of the predefined resource on the predefined narrowband resource, or is a part of the predefined resource on another narrowband resource that is not predefined.

With reference to any one of the third aspect or the first to the fourteenth possible implementation manners of the third aspect, in a fifteenth possible implementation manner, the configuration information of the first physical downlink control channel includes configuration information of a common search space in the first physical downlink control channel, and/or configuration information of a user equipment specific search space in the first physical downlink control channel.

A fourth aspect of the embodiments of the present disclosure provides user equipment, including:

a configuration information receiving module, configured to receive configuration information of a first physical downlink control channel on a predefined resource, where the configuration information of the first physical downlink control channel is used to indicate manners of sending and receiving the first physical downlink control channel; and a control channel receiving module, configured to receive the first physical downlink control channel according to the configuration information of the first physical downlink control channel.

In a first possible implementation manner of the fourth aspect, the configuration information receiving module is specifically configured to: receive a random access response message on the predefined resource, and obtain the configuration information of the first physical downlink control channel carried in the random access response message.

With reference to the possible implementation manner of the fourth aspect, in a second possible implementation manner, the configuration information receiving module is specifically configured to:

receive scheduling information of a random access response message on the predefined resource, where the scheduling information of the random access response message is used to indicate manners of sending and receiving the random access response message; and receive the random access response message according to the scheduling information of the random access response message, and obtain the configuration information of the first physical downlink control channel carried in the random access response message.

With reference to the fourth aspect or the second possible implementation manner of the fourth aspect, in a third possible implementation manner, an operation of receiving, by the configuration information receiving module, the scheduling information of the random access response message on the predefined resource is specifically:

determining a common search space on the predefined resource; and receiving, in the common search space, a second physical downlink control channel used to schedule the random access response message, and obtaining the scheduling information that is of the random access response message and that is carried in the second physical downlink control channel.

With reference to the fourth aspect or the first, or the second, or the third possible implementation manner of the fourth aspect, in a fourth possible implementation manner, an operation of obtaining, by the configuration information receiving module, the configuration information of the first physical downlink control channel carried in the random access response message is specifically:

receiving the random access response message, and obtaining indication information carried in the random access response message, where the indication information includes scheduling information of a random access contention resolution message, and the scheduling information of the random access contention resolution message is used to indicate manners of sending and receiving the random access contention resolution message; and receiving the random access contention resolution message according to the scheduling information of the random access contention resolution message, and obtaining the configuration information of the first physical downlink control channel carried in the random access contention resolution message; or receiving the random access response message, and obtaining indication information carried in the random access response message, where the indication information includes configuration information of a third physical downlink control channel, the configuration information of the third physical downlink control channel is used to indicate manners of sending and receiving the third physical downlink control channel, the third physical downlink control channel is used to transmit scheduling information of a random access contention resolution message, the scheduling information of the random access contention resolution message is used to indicate manners of sending and receiving the random access contention resolution message, and the configuration information of the third physical downlink control channel includes configuration information of a common search space in the third physical downlink control channel, and/or configuration information of a user equipment specific search space in a physical downlink control resource of the third physical downlink control channel; and receiving the random access contention resolution message according to the scheduling information of the random access contention resolution message, and obtaining the configuration information of the first physical downlink control channel carried in the random access contention resolution message.

With reference to the fourth aspect or the fourth possible implementation manner of the fourth aspect, in a fifth possible implementation manner, the indication information is added by a base station device to the random access response message in the following manner:

adding a new field to the random access response message, where the new field includes the indication information; or re-explaining an existing field in the random access response message, and writing the indication information into the existing field that is re-explained.

With reference to the possible implementation manner of the fourth aspect, in a sixth possible implementation manner, the configuration information receiving module is specifically configured to: receive, on the predefined resource, a data channel carrying the configuration information of the first physical downlink control channel, and obtain the configuration information of the first physical downlink control channel, where the data channel is sent in an unscheduled manner.

With reference to the fourth aspect or the first or the second possible implementation manner of the fourth aspect, in a sixth possible implementation manner, that the random access response message carries the configuration information of the first physical downlink control channel includes:

adding a new field to the random access response message, where the new field includes the configuration information of the first physical downlink control channel; or re-explaining an existing field in the random access response message, and writing the configuration information of the first physical downlink control channel into the existing field that is re-explained.

With reference to the fourth aspect or the first possible implementation manner of the fourth aspect, in a seventh possible implementation manner, the first physical downlink control channel is a physical downlink control channel used to schedule a random access contention resolution message.

With reference to the possible implementation manner of the fourth aspect, in an eighth possible implementation manner, the configuration information receiving module is specifically configured to:

receive a fourth physical downlink control channel on the predefined resource, and obtain the configuration information of the first physical downlink control channel carried in the fourth physical downlink control channel; or receive a fourth physical downlink control channel on the predefined resource; and receive, according to the fourth physical downlink control channel, a message carrying the configuration information of the first physical downlink control channel, and obtain the first physical downlink control channel.

With reference to the possible implementation manner of the fourth aspect, in a ninth possible implementation manner, the predefined resource is a part or all of a physical downlink control channel resource, the physical downlink control channel resource is a set of a resource to which a physical downlink control channel is mapped, and a quantity of the physical downlink control channel resources is one or more.

With reference to any one of the fourth aspect or the first to the tenth possible implementation manners of the fourth aspect, in an eleventh possible implementation manner, the predefined resource is determined by using a preset rule; and/or notified by using a higher layer; or one or more resources are configured by using a higher layer, and the predefined resource is determined from the one or more resources by using a predefined rule.

With reference to the possible implementation manner of the fourth aspect, in a twelfth possible implementation manner, the preset rule includes:

the predefined resource is determined according to a quantity of physical resource blocks in the predefined resource, and the predefined resource includes one or more physical resource blocks.

With reference to any one of the fourth aspect or the first to the twelfth possible implementation manners of the fourth aspect, in a thirteenth possible implementation manner, the predefined resource includes a predefined time frequency resource.

With reference to any one of the fourth aspect or the first to the thirteenth possible implementation manners of the fourth aspect, in a fourteenth possible implementation manner, the predefined resource is a part of a predefined narrowband resource, and the first physical downlink control channel is a part of the predefined resource on the predefined narrowband resource, or is a part of the predefined resource on another narrowband resource that is not predefined.

With reference to any one of the fourth aspect or the first to the fourteenth possible implementation manners of the fourth aspect, in a fifteenth possible implementation manner, the configuration information of the first physical downlink control channel includes configuration information of a common search space in the first physical downlink control channel, and/or configuration information of a user equipment specific search space in the first physical downlink control channel.

A fifth aspect of the embodiments of the present disclosure provides a computer storage medium, where the computer storage medium stores a program, and when the program is executed, some or all steps in the physical downlink control channel sending method provided in the first aspect are performed.

A sixth aspect of the embodiments of the present disclosure provides a computer storage medium, where the computer storage medium stores a program, and when the program is executed, some or all steps in the physical downlink control channel receiving method provided in the second aspect are performed.

A seventh aspect of the present disclosure provides a base station device, where the base station device includes: a network interface, a memory, and a processor, where the memory stores a group of program, and the processor is configured to invoke the program stored in the memory, to perform the following operations:

sending configuration information of a first physical downlink control channel on a predefined resource, where the configuration information of the first physical downlink control channel is used to indicate manners of sending and receiving the first physical downlink control channel; and sending the first physical downlink control channel according to the configuration information of the first physical downlink control channel.

A seventh aspect of the present disclosure provides user equipment, where the user equipment includes: a network interface, a memory, and a processor, where the memory stores a group of program, and the processor is configured to invoke the program stored in the memory, to perform the following operations:

receiving configuration information of a first physical downlink control channel on a predefined resource, where the configuration information of the first physical downlink control channel is used to indicate manners of sending and receiving the first physical downlink control channel; and receiving the first physical downlink control channel according to the configuration information of the first physical downlink control channel.

As can be seen from the foregoing, in the embodiments of the present disclosure, first, configuration information of a physical downlink control channel is sent on a predefined resource, and the physical downlink control channel is sent according to the configuration information of the physical downlink control channel, thereby implementing sending of a physical downlink control channel, and resolving a problem that when narrowband user equipment works in a system whose system bandwidth is greater than an operating bandwidth of the narrowband user equipment, transmission of a physical downlink control channel cannot be implemented. The physical downlink control channel includes but is not limited to a PDCCH channel and/or an EPDCCH channel.

BRIEF DESCRIPTION OF THE DRAWINGS

To describe embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
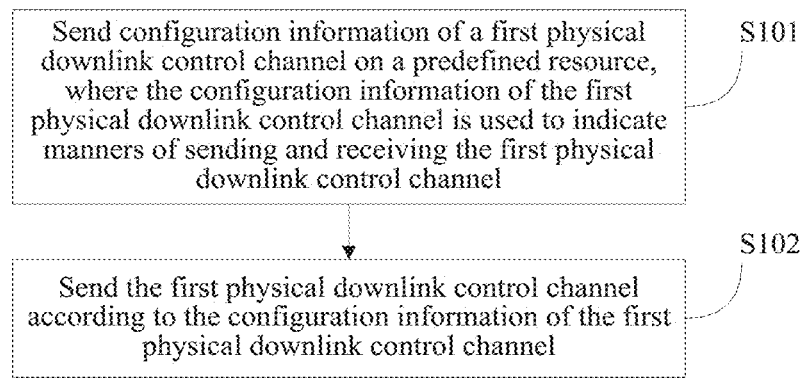
FIG. 1 is a schematic flowchart of a physical downlink control channel sending method according to an embodiment of the present disclosure.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

The technical solutions of the embodiments of the present disclosure may be applied to various communications systems, such as: a Global System of Mobile Communications (Global System of Mobile communication, "GSM" for short) system, a Code Division Multiple Access (Code Division Multiple Access, "CDMA" for short) system, a Wideband Code Division Multiple Access (Wideband Code Division Multiple Access, "WCDMA" for short) system, a general packet radio service (General Packet Radio Service, "GPRS" for short), a Long Term Evolution (Long Term Evolution, "LTE" for short) system, an LTE frequency division duplex (Frequency Division Duplex, "FDD" for short) system, an LTE time division duplex (Time Division Duplex, "TDD" for short), a Universal Mobile Telecommunications System (Universal Mobile Telecommunication System, "UMTS" for short), a Worldwide Interoperability for Microwave Access (Worldwide Interoperability for Microwave Access, "WiMAX" for short) communications system or the like.

In the embodiments of the present disclosure, user equipment (User Equipment, "UE" for short) may include a terminal (Terminal), a mobile station (Mobile Station, "MS" for short), a mobile terminal (Mobile Terminal), and the like. The user equipment may communicate with one or more core networks through a radio access network (Radio Access Network, "RAN" for short). For example, the user equipment may be a mobile phone (also referred to as a "cellular" phone) or a computer with a mobile terminal. For example, the user equipment may also be a portable, pocket-sized, handheld, computer built-in, or in-vehicle mobile apparatus, which exchanges voice and/or data with the radio access network.

A base station device in the embodiments of the present disclosure may be a base station (Base Transceiver Station, "BTS" for short) in GSM or CDMA, may be a base station (NodeB, "NB" for short) in WCDMA, or may further be an evolved NodeB (Evolved Node B, "eNB" for short) in LTE.

It should be understood that, "transmission of a physical downlink control channel" mentioned in the embodiments of the present disclosure includes "sending and receiving a physical downlink control channel", and refers to: Transmit data, for example, scheduling information or DCI (Downlink Control Information), of a physical downlink control channel on the physical downlink control channel, for example, on a PDCCH or an EPDCCH.

It should be further understood that, a physical resource block in the embodiments of the present disclosure may be a PRB (Physical Resource Block). The PRB is a resource used for data transmission. A size of the resource is measured by using a frequency (a unit is carrier) and time (a unit is timeslot). Generally, one PRB includes 12 consecutive carriers in a frequency domain and one timeslot in a time domain.

It should be noted that, an essence of the embodiments of the present disclosure may be understood as: A physical downlink control channel is divided into a pre-known physical downlink control channel and a physical downlink control channel that is not pre-known. Pre-knowing refers to: A base station device and user equipment already pre-know configuration information of the physical downlink control channel. In the present disclosure, the pre-known physical downlink control channel is sent on a predefined resource, to configure the physical downlink control channel that is not pre-known. It should be noted that, in the embodiments of the present disclosure, the first physical downlink control channel is a physical downlink control channel that is not pre-known, and the second, third, and fourth physical downlink control channels are pre-known physical downlink control channels.

FIG. 1 is a schematic flowchart of a physical downlink control channel sending method according to an embodiment of the present disclosure. The method is implemented in a base station device. As shown in the figure, a process of the physical downlink control channel sending method in this embodiment may include the following steps.

S101: Send configuration information of a first physical downlink control channel on a predefined resource, where the configuration information of the first physical downlink control channel is used to indicate manners of sending and receiving the first physical downlink control channel.

The predefined resource may be one or more time frequency resources, but is not limited to the time frequency resource. For example, the predefined resource may be a code domain resource, and/or a spatial resource. It should be noted that, this embodiment of the present disclosure is described by using a time frequency resource as an example.

Figures 13, 14:
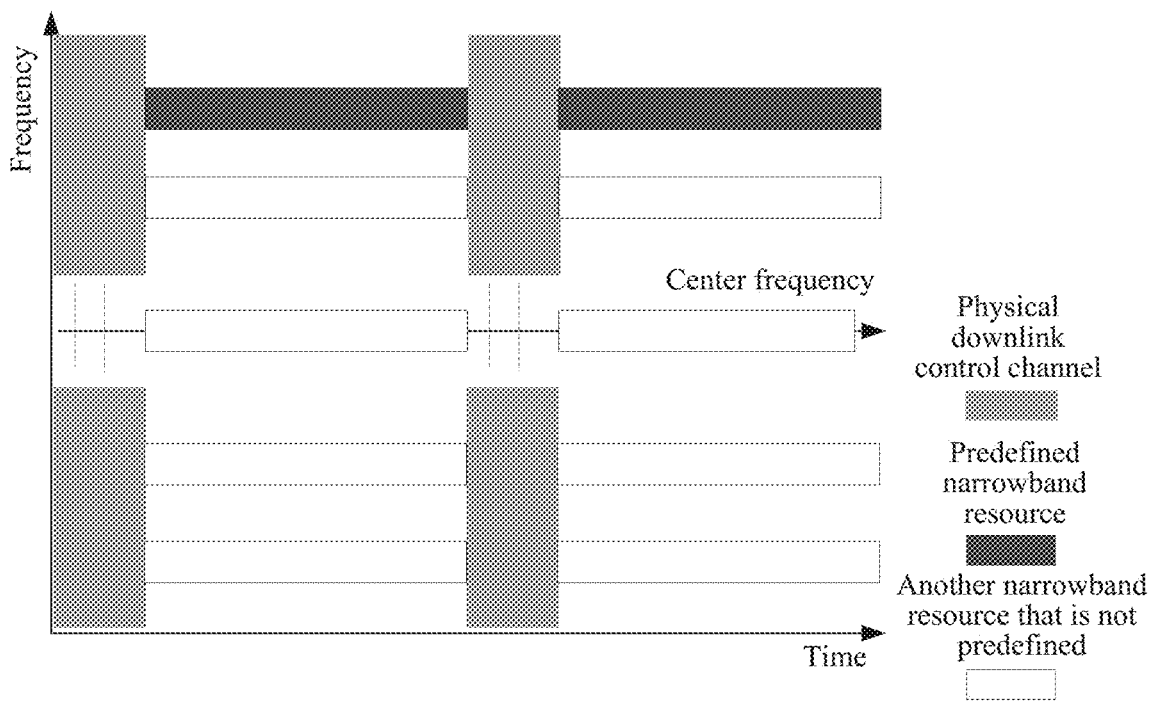
FIG. 13 is a schematic diagram of a frequency band resource according to an embodiment of the present disclosure.
FIG. 14 is a schematic diagram of fields in a random access response message according to an embodiment of the present disclosure.

The predefined resource is a part of a predefined narrowband resource, and a physical downlink control channel is a part of the predefined resource on the predefined narrowband resource, or is a part of the predefined resource on another narrowband resource that is not predefined. In an optional embodiment, referring to a schematic diagram, shown in FIG. 13, of a frequency band resource, a relationship among the predefined narrowband resource, another narrowband resource that is not predefined, and the physical downlink control channel is shown in the figure. Predefining refers to: The base station device and user equipment already predefine configuration information, for example, a location of a resource used for transmission and a quantity of resources used for transmission, and a scrambling sequence used for transmission. It should be understood that the predefined resource and the predefined narrowband resource respectively are a resource whose configuration information is already predefined and a narrowband resource whose configuration information is already predefined.

The physical downlink control channel is a control channel carrying scheduling information. For example, the physical downlink control channel in this embodiment of the present disclosure includes one or more of a PDCCH, an EPDCCH, an RPDCCH, or the like, and especially, refers to an EPDCCH. The method in the present disclosure is described by using an example in which the physical downlink control channel is an EPDCCH. In addition, configuration information of the physical downlink control channel may indicate a transmission manner of the physical downlink control channel, or a manner of transmitting data of the physical downlink control channel on the physical downlink control channel, for example, a location of a resource used for transmission and a quantity of resources used for transmission, a scrambling sequence used for transmission, and configuration of a physical uplink control channel (PUCCH).

Further, the configuration information of the physical downlink control channel includes configuration information of a common search space (that is, "CSS") in the physical downlink control channel, and/or configuration information of a user equipment specific search space (that is, "USS") in the physical downlink control channel. The physical downlink control channel especially refers to the first physical downlink control channel and a third physical downlink control channel. For example, the configuration information of the first physical downlink control channel includes configuration information of a CSS and/or configuration information of a USS in the first physical downlink control channel, and configuration information of the third physical downlink control channel includes configuration information of a CSS and/or configuration information of a USS in the third physical downlink control channel.

Specifically, the base station device sends the configuration information of the first physical downlink control channel on the predefined resource. The configuration information of the first physical downlink control channel is used to indicate the manners of sending and receiving the first physical downlink control channel. The manner of receiving, by the user equipment, the first physical downlink control channel may be, for example, a location of a resource used to receive the first physical downlink control channel and a quantity of resources used to receive the first physical downlink control channel, a used scrambling sequence, and a used uplink control channel resource.

Further, the predefined resource may be a part or all of a physical downlink control channel resource. The physical downlink control channel resource is a set of a resource to which the physical downlink control channel is mapped, and a quantity of the physical downlink control channel resources is one or more. It should be noted that, that "the physical downlink control channel resource is a set of a resource to which the physical downlink control channel is mapped" refers to that "the physical downlink control channel resource is a set of a resource to which the physical downlink control channel may be mapped". For example, the predefined resource is a part of a CSS resource of a pre-known physical downlink control channel. In this embodiment of the present disclosure, other configuration information of a physical downlink control channel resource of the CSS (for example, configuration information of all CSSs in the physical downlink control channel of the CSS, or configuration information of a USS in the physical downlink control channel of the CSS) may be sent by using the predefined resource. Furthermore, if one or more physical downlink control channel resources are defined in a communications system, the configuration information of the physical downlink control channel may be used to configure a physical downlink control channel on the one or more physical downlink control channel resources. For example, the predefined resource is a part or all of a CSS resource of a pre-known physical downlink control channel resource. In this embodiment of the present disclosure, physical downlink control channel configuration of one or more physical downlink control channel resources other than the pre-known physical downlink control channel resource may be sent on the predefined resource.

Based on the foregoing description, in a specific implementation process, a specific implementation manner of sending, by the base station device, the configuration information of the first physical downlink control channel on the predefined resource may be implemented by using the following three solutions.

Solution 1: The base station device sends a random access response message on the predefined resource, where the random access response message carries the configuration information of the first physical downlink control channel. The "carrying" herein may refer to "including", that is, the random access response message includes the configuration information of the first physical downlink control channel.

Alternatively, the base station device sends scheduling information of the random access response message on the predefined resource, where the scheduling information of the random access response message is used to indicate manners of sending and receiving the random access response message; and sends the random access response message according to the scheduling information of the random access response message, and adds the configuration information of the first physical downlink control channel to the random access response message. It should be noted that the manner of receiving, by the user equipment, the random access response message may be, for example, a location of a resource block used to receive the random access response message and a quantity of resource blocks used to receive the random access response message, and/or a used modulation and coding scheme. Further, a specific operation of "sending, by the base station device, the scheduling information of the random access response message on the predefined resource" may be: first determining, by the base station device, a common search space on the predefined resource; then, sending, in the common search space, a second physical downlink control channel used to schedule the random access response message, where the second physical downlink control channel carries the scheduling information of the random access response message. Similarly, the "carrying" herein may also refer to "including".

In the foregoing description, the random access response message is an RAR (Random Access Response) message, and how to send a common message before the RAR is not limited in this embodiment of the present disclosure. For example, how to send a public broadcast channel (PBCH) and a system message (SIB1 (System Information Block), or SI) before the RAR is not limited in the present disclosure. Certainly, the common message before the RAR may be used to configure the predefined resource.

Optionally, the base station device may implement, by using the following method, an operation of "sending the random access response message, and adding the configuration information of the first physical downlink control channel to the random access response message": sending, by the base station device, the random access response message, and adding indication information to the random access response message, where the indication information includes the configuration information of the first physical downlink control channel. In an optional implementation manner, the first physical downlink control channel is used to schedule a random access contention resolution message Msg4, that is, the indication information carried in the random access response message includes configuration information of a physical downlink control channel of the random access contention resolution message Msg4.

Further, optionally, the base station device may implement, by using the following two manners, an operation of "sending the random access response message, and adding the configuration information of the first physical downlink control channel to the random access response message". 1.

The base station device sends the random access response message, and adds indication information to the random access response message, where the indication information includes scheduling information of a random access contention resolution message, and the scheduling information of the random access contention resolution message is used to indicate manners of sending and receiving the random access contention resolution message; and sends the random access contention resolution message, where the random access contention resolution message carries the configuration information of the first physical downlink control channel. Similarly, the "carrying" herein may also refer to "including". 2. The base station device sends the random access response message, and adds indication information to the random access response message, where the indication information includes configuration information of a third physical downlink control channel, the configuration information of the third physical downlink control channel is used to indicate manners of sending and receiving the third physical downlink control channel, the third physical downlink control channel is used to transmit scheduling information of a random access contention resolution message, the scheduling information of the random access contention resolution message is used to indicate manners of sending and receiving the random access contention resolution message, and the configuration information of the third physical downlink control channel includes configuration information of a common search space in the third physical downlink control channel, and/or configuration information of a user equipment specific search space in a physical downlink control resource of the third physical downlink control channel; and sends the random access contention resolution message, where the random access contention resolution message carries the configuration information of the first physical downlink control channel.

In the foregoing description, the random access contention resolution message may be an MSG4. The MSG4 may be used to resolve a problem of conflicts in a random access process caused by the fact that the user equipment selects a same random access resource, for example, the user equipment chooses to send a same random access preamble sequence on a same time frequency resource. It should be noted that, a difference from this embodiment of the present disclosure lies in: According to an existing protocol, the RAR message carries only scheduling information of an MSG3 (that is, a random access procedure message 3), and does not carry scheduling information of the MSG4 or a third physical downlink control channel used to transmit scheduling information of the MSG4.

Further optionally, the base station device may implement, by using the following two manners, an operation of "adding the indication information to the random access response message". 1. The base station device adds a new field to the random access response message, where the new field includes the indication information. 2. The base station device re-explains an existing field in the random access response message, and adds the indication information to the existing field that is re-explained. The re-explaining an existing field is: Re-define usage of some bits of the existing field. In an optional example, referring to a schematic diagram, shown in FIG. 14, of fields of the random access response message, as shown in the figure, a UL Grant field is used to schedule the MSG3, and the field occupies a capacity of 20 bits. However, in a scenario of a narrowband resource, fewer bits than 20 bits are needed to schedule the MSG3. In this embodiment of the present disclosure, the field may be re-explained, only several bits are used to schedule the MSG3, and the remaining bits are used to transmit the indication information.

Similarly, optionally, the base station device may implement, by using the following two manners, an operation of "adding the configuration information of the first physical downlink control channel to the random access response message". 1. The base station device adds a new field to the random access response message, where the new field includes the configuration information of the first physical downlink control channel. 2. The base station device re-explains an existing field of the random access response message, and writes the configuration information of the first physical downlink control channel into the existing field that is re-explained.

Solution 2. The base station device sends, on the predefined resource, a data channel carrying the configuration information of the first physical downlink control channel. The data channel is sent in an unscheduled manner. It should be noted that the existing data channel is sent in a scheduled manner. In this embodiment of the present disclosure, the scheduled manner is not used, for example, a pre-known modulation and coding scheme or a manner without feedback is used.

It should be noted that sending a data channel refers to sending data of the data channel on the data channel.

Optionally, the data channel in this solution may be a random access contention resolution message. That is, the base station device sends the random access contention resolution message on the predefined resource, and adds the configuration information of the first physical downlink control channel to the random access contention resolution message. In this embodiment, a method for transmitting a message before the random access contention resolution message is not limited, and a manner of determining the predefined resource is not limited. For example, information about the predefined resource is determined in a manner of notification by using a system message or a random access response message, or in a manner of determining by using a pre-known rule.

In an optional example, an implementation scenario of this solution may be as follows.

The base station device sends, on a predefined narrowband resource, a message carrying configuration information of an EPDCCH. A manner of sending the message carrying the configuration information of the EPDCCH may be a modulation and coding scheme. The configuration information of the EPDCCH may be configuration information of a CSS in the EPDCCH on one or more EPDCCH resources, for example, on the predefined narrowband resource, or may be configuration information of a CSS in an EPDCCH on another narrowband resource. The configuration information of the CSS may be, for example, a location of a PRB of the CSS, and/or a size of the PRB, and/or a starting symbol location, and/or a transmission manner (for example, a centralized manner or a distributed manner), and/or a subframe mode.

The user equipment receives, on the predefined narrowband resource, the message carrying the configuration information of the CSS in the EPDCCH, obtains the configuration information of the CSS in the EPDCCH according to the received message, and listens to the EPDCCH in a CSS on a narrowband resource of the selected EPDCCH.

A network determines configuration of a CSS in an EPDCCH on one or more EPDCCH resources, sends, on the predefined narrowband resource, a message carrying the determined configuration information of the CSS in the EPDCCH, and sends the EPDCCH in the CSS in the EPDCCH on the selected one or more EPDCCH narrowband resources, so that the user equipment may listen to the EPDCCH in the CSS in the EPDCCH on the same selected EPDCCH narrowband resource.

It should be noted that, the user equipment and the network need to determine the selected EPDCCH narrowband resource according to a same rule, to ensure that the narrowband resource on which the user equipment listens to the EPDCCH is the same as the narrowband resource on which the network sends the EPDCCH.

In addition, optionally, the configuration information of the CSS in the EPDCCH may be configuration information of a USS in the EPDCCH, and this example is not listed.

Solution 3. The base station device sends a fourth physical downlink control channel on the predefined resource, where the fourth physical downlink control channel carries the configuration information of the first physical downlink control channel. Similarly, the "carrying" herein may also refer to "including".

Alternatively, the base station device sends the fourth physical downlink control channel on the predefined resource, and sends, according to the fourth physical downlink control channel, a message carrying the configuration information of the first physical downlink control channel. The message carrying the configuration information of the first physical downlink control channel may be a common message, or a user equipment specific message.

Optionally, the fourth physical downlink control channel in this solution may be a physical downlink control channel used to schedule a random access contention resolution message. That is, the base station device sends, on the predefined resource, the fourth physical downlink control channel used to schedule the random access contention resolution message, receives the random access contention resolution message according to the fourth physical downlink control channel, and adds the configuration information of the first physical downlink control channel to the random access contention resolution message. Similarly, in this solution, a manner of transmitting a channel and a message before the fourth physical downlink control channel is not limited, and a manner of determining the predefined resource is not limited. For example, information about the predefined resource is determined in a manner of notification by using a system message or a random access response message, or in a manner of determining by using a pre-known rule.

In an optional example, an implementation scenario of this solution may be as follows.

The base station device sends a fourth EPDCCH channel on a predefined narrowband resource. Configuration information of a CSS on a physical downlink control channel resource of the fourth EPDCCH is pre-known, that is, the base station device and the user equipment already pre-know the configuration information of the CSS on the physical downlink control channel resource of the fourth EPDCCH, for example, a location of a PRB of the CSS, and/or a size of the PRB, and/or a starting symbol location, and/or a transmission manner (for example, a centralized manner or a distributed manner), and/or a subframe mode.

The user equipment receives the fourth EPDCCH channel on the predefined narrowband resource, and obtains the configuration information of the first physical downlink control channel from the received fourth EPDCCH channel; or receives, by using the received fourth EPDCCH channel, a message carrying the configuration information of the first physical downlink control channel.

A network sends the fourth EPDCCH channel on the predefined resource, and adds the configuration information of the first physical downlink control channel to the fourth physical downlink control channel; or sends, according to the fourth physical downlink control channel, a message carrying the configuration information of the first physical downlink control channel.

Especially, in the foregoing solution 1, solution 2, and solution 3, the predefined resource may be a resource pre-stipulated in a system or standard, or may be a resource notified by using signaling. The signaling is one or more of RRC common signaling, RRC dedicated signaling, Medium Access Control (MAC) signaling, a MAC control element, a physical control channel, or control information.

The predefined resource may be determined in the following three manners.

Manner 1. The predefined resource is determined by using a preset rule. Optionally, the predefined resource is determined according to a quantity of physical resource blocks in the predefined resource, and the predefined resource includes one or more physical resource blocks. For example, an index of a starting PRB or an ending PRB of the predefined resource is a function of n. In an embodiment, assuming that in solution 1, n PRBs are used to send an RAR message, or in solution 2, n PRBs are used to send configuration information of a CSS in an EPDCCH, or in solution 3, a CSS in an EPDCCH includes n PRB resources, the index of the starting PRB or the ending PRB of the predefined resource is an integer multiple of n. In another embodiment, the index of the starting PRB or the ending PRB of the predefined resource is an integer multiple of n plus or minus a preset compensation value. Further, if there are multiple predefined resources, for example, 2 or 4, in PRBs starting from a PRB whose index is an integer multiple of 2, information is transmitted only according to a quantity of resources being 2, and in PRBs starting from a PRB whose index is an integer multiple of 4, information is transmitted only according to a quantity of resources being 4. It should be noted that, the predefined resource may be determined uniquely in a specific moment, for example, a predefined resource whose PRB is 2 or 4 may be determined uniquely.

Manner 2. The predefined resource is notified by using higher-layer signaling. For example, many predefined resources are configured in a higher layer, and are notified to the user equipment by using a PBCH channel. It should be noted that, the predefined resource is certain in a specific moment, and related configuration information may be certain and known.

Manner 3. One or more resources are configured by using higher-layer signaling, and the predefined resource is determined from the one or more resources by using a predefined rule. That is, the foregoing manner 1 and manner 2 are combined. A range is determined by using higher-layer signaling, and a specific resource or some specific resources are determined from the range according to a rule.

S102: Send the first physical downlink control channel according to the configuration information of the first physical downlink control channel.

Specifically, the base station device determines a sending parameter according to the configuration information of the first physical downlink control channel, and sends the first physical downlink control channel according to the sending parameter, so that the user equipment receives the first physical downlink control channel.

It should be noted that, if the configuration information of the first physical downlink control channel is predefined, in S101, the configuration information of the first physical downlink control channel does not need to be sent, and the first physical downlink control channel may be sent on the predefined resource.

That "the configuration information of the first physical downlink control channel is predefined" includes that "a part of the configuration information of the first physical downlink control channel is predefined, and a part is configured". That is, the configuration information of the first physical downlink control channel includes first configuration information and second configuration information, the first configuration information and the second configuration information include one or more parameter configurations of the first physical downlink control channel, the first configuration information is predefined, and the second configuration information is configured.

In an optional specific implementation manner:

The random access response message carries the first configuration information of the first physical downlink control channel. Alternatively, the second physical downlink control channel carries the first configuration information of the first physical downlink control channel. For example, the second physical downlink control channel is a control channel used to schedule the random access response message.

The second configuration information of the first physical downlink control channel is predefined in the system or standard. Alternatively, system information carries the second configuration information of the first physical downlink control channel.

As can be seen from the foregoing, in this embodiment of the present disclosure, first, configuration information of a physical downlink control channel is sent on a predefined resource, and the physical downlink control channel is sent according to the configuration information of the physical downlink control channel, thereby implementing sending of a physical downlink control channel, and resolving a problem that when narrowband user equipment works in a system whose system bandwidth is greater than an operating bandwidth of the narrowband user equipment, transmission of a physical downlink control channel cannot be implemented. The physical downlink control channel includes but is not limited to a PDCCH channel and/or an EPDCCH channel.

Figure 2:
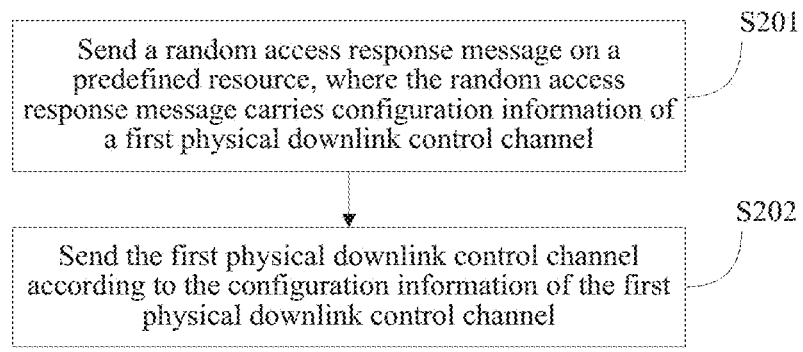
FIG. 2 is a schematic flowchart of another physical downlink control channel sending method according to an embodiment of the present disclosure.

FIG. 2 is a schematic flowchart of another physical downlink control channel sending method according to an embodiment of the present disclosure. The method is implemented in a base station device, and includes a specific implementation process of solution 1 mentioned in the embodiment corresponding to FIG. 1. As shown in the figure, a process of the physical downlink control channel sending method in this embodiment may include the following steps.

S201: Send a random access response message on a predefined resource, where the random access response message carries configuration information of a first physical downlink control channel.

The random access response message is an RAR (Random Access Response) message, and how to send a common message before the RAR is not limited in this embodiment of the present disclosure. For example, how to send a public broadcast channel (PBCH) and a system message (SIB1 (System Information Block), or SI) before the RAR is not limited in the present disclosure. Certainly, the common message before the RAR may be used to configure the predefined resource.

Specifically, the base station device sends the random access response message on the predefined resource, where the random access response message carries the configuration information of the first physical downlink control channel. The "carrying" herein may refer to "including", that is, the random access response message includes the configuration information of the first physical downlink control channel.

In an optional implementation manner, the base station device may first send scheduling information of the random access response message on the predefined resource, where the scheduling information of the random access response message is used to indicate manners of sending and receiving the random access response message; then, send the random access response message according to the scheduling information of the random access response message, and add the configuration information of the first physical downlink control channel to the random access response message. It should be noted that the manner of receiving, by user equipment, the random access response message may be, for example, a location of a resource block used to receive the random access response message and a quantity of resource blocks used to receive the random access response message, and/or a used modulation and coding scheme. Further, a specific operation of "sending, by the base station device, the scheduling information of the random access response message on the predefined resource" may be: first determining, by the base station device, a common search space on the predefined resource; then, sending, in the common search space, a second physical downlink control channel used to schedule the random access response message, where the second physical downlink control channel carries the scheduling information of the random access response message. Similarly, the "carrying" herein may also refer to "including".

Optionally, the base station device may implement, by using the following method, an operation of "sending the random access response message, and adding the configuration information of the first physical downlink control channel to the random access response message": sending, by the base station device, the random access response message, and adding indication information to the random access response message, where the indication information includes the configuration information of the first physical downlink control channel. In an optional implementation manner, the first physical downlink control channel is used to schedule a random access contention resolution message Msg4, that is, the indication information carried in the random access response message includes configuration information of a physical downlink control channel of the random access contention resolution message Msg4.

Further, optionally, the base station device may implement, by using the following two manners, an operation of "sending the random access response message, and adding the configuration information of the first physical downlink control channel to the random access response message". 1. The base station device sends the random access response message, and adds indication information to the random access response message, where the indication information includes scheduling information of a random access contention resolution message, and the scheduling information of the random access contention resolution message is used to indicate manners of sending and receiving the random access contention resolution message; and sends the random access contention resolution message, where the random access contention resolution message carries the configuration information of the first physical downlink control channel. Similarly, the "carrying" herein may also refer to "including". 2. The base station device sends the random access response message, and adds indication information to the random access response message, where the indication information includes configuration information of a third physical downlink control channel, the configuration information of the third physical downlink control channel is used to indicate manners of sending and receiving the third physical downlink control channel, the third physical downlink control channel is used to transmit scheduling information of a random access contention resolution message, the scheduling information of the random access contention resolution message is used to indicate manners of sending and receiving the random access contention resolution message, and the configuration information of the third physical downlink control channel includes configuration information of a common search space in the third physical downlink control channel, and/or configuration information of a user equipment specific search space in a physical downlink control resource of the third physical downlink control channel; and sends the random access contention resolution message, where the random access contention resolution message carries the configuration information of the first physical downlink control channel.

In the foregoing description, the random access contention resolution message may be an MSG4. The MSG4 may be used to resolve a problem of conflicts in a random access process caused by the fact that the user equipment selects a same random access resource, for example, the user equipment chooses to send a same random access preamble sequence on a same time frequency resource. It should be noted that, a difference from this embodiment of the present disclosure lies in: According to an existing protocol, the RAR message carries only scheduling information of an MSG3 (that is, a random access procedure message 3), and does not carry scheduling information of the MSG4 or a third physical downlink control channel used to transmit scheduling information of the MSG4.

Further optionally, the base station device may implement, by using the following two manners, an operation of "adding the indication information to the random access response message". 1. The base station device adds a new field to the random access response message, where the new field includes the indication information. 2. The base station device re-explains an existing field in the random access response message, and adds the indication information to the existing field that is re-explained. The re-explaining an existing field is: Re-define usage of some bits of the existing field. In an optional example, referring to a schematic diagram, shown in FIG. 14, of fields of the random access response message, as shown in the figure, a UL Grant field is used to schedule the MSG3, and the field occupies a capacity of 20 bits. However, in a scenario of a narrowband resource, fewer bits than 20 bits are needed to schedule the MSG3. In this embodiment of the present disclosure, the field may be re-explained, only several bits are used to schedule the MSG3, and the remaining bits are used to transmit the indication information.

Similarly, optionally, the base station device may implement, by using the following two manners, an operation of "adding the configuration information of the first physical downlink control channel to the random access response message". 1. The base station device adds a new field to the random access response message, where the new field includes the configuration information of the first physical downlink control channel. 2. The base station device re-explains an existing field of the random access response message, and writes the configuration information of the first physical downlink control channel into the existing field that is re-explained.

Especially, the predefined resource may be a resource pre-stipulated in a system or standard, or may be a resource notified by using signaling. The signaling is one or more of RRC common signaling, RRC dedicated signaling, Medium Access Control (MAC) signaling, a MAC element, a physical control channel, or control information. The predefined resource in this embodiment of the present disclosure may be determined in the following three manners.

Manner 1. The predefined resource is determined by using a preset rule. Optionally, the predefined resource is determined according to a quantity of physical resource blocks in the predefined resource, and the predefined resource includes one or more physical resource blocks. For example, an index of a starting PRB or an ending PRB of the predefined resource is a function of n. In an embodiment, assuming that in solution 1, n PRBs are used to send an RAR message, or in solution 2, n PRBs are used to send configuration information of a CSS in an EPDCCH, or in solution 3, a CSS in an EPDCCH includes n PRB resources, the index of the starting PRB or the ending PRB of the predefined resource is an integer multiple of n. In another embodiment, the index of the starting PRB or the ending PRB of the predefined resource is an integer multiple of n plus or minus a preset compensation value. Further, if there are multiple predefined resources, for example, 2 or 4, in PRBs starting from a PRB whose index is an integer multiple of 2, information is transmitted only according to a quantity of resources being 2, and in PRBs starting from a PRB whose index is an integer multiple of 4, information is transmitted only according to a quantity of resources being 4. It should be noted that, the predefined resource may be determined uniquely in a specific moment, for example, a predefined resource whose PRB is 2 or 4 may be determined uniquely.

Manner 2. The predefined resource is notified by using higher-layer signaling. For example, many predefined resources are configured in a higher layer, and are notified to the user equipment by using a PBCH channel. It should be noted that, the predefined resource is certain in a specific moment, and related configuration information may be certain and known.

Manner 3. One or more resources are configured by using higher-layer signaling, and the predefined resource is determined from the one or more resources by using a predefined rule. That is, the foregoing manner 1 and manner 2 are combined. A range is determined by using higher-layer signaling, and a specific resource or some specific resources are determined from the range according to a rule.

S202: Send the first physical downlink control channel according to the configuration information of the first physical downlink control channel.

Specifically, the base station device determines a sending parameter according to the configuration information of the first physical downlink control channel, and sends the first physical downlink control channel according to the sending parameter, so that the user equipment receives the first physical downlink control channel.

It should be noted that, if the configuration information of the first physical downlink control channel is predefined, in S201, the configuration information of the first physical downlink control channel does not need to be sent, and the first physical downlink control channel may be sent on the predefined resource.

That "the configuration information of the first physical downlink control channel is predefined" includes that "a part of the configuration information of the first physical downlink control channel is predefined, and a part is configured". That is, the configuration information of the first physical downlink control channel includes first configuration information and second configuration information, the first configuration information and the second configuration information include one or more parameter configurations of the first physical downlink control channel, the first configuration information is predefined, and the second configuration information is configured.

In an optional specific implementation manner:

The random access response message carries the first configuration information of the first physical downlink control channel. Alternatively, the second physical downlink control channel carries the first configuration information of the first physical downlink control channel. For example, the second physical downlink control channel is a control channel used to schedule the random access response message.

The second configuration information of the first physical downlink control channel is predefined in the system or standard. Alternatively, system information carries the second configuration information of the first physical downlink control channel.

As can be seen from the foregoing, in this embodiment of the present disclosure, first, an RAR message is sent on a predefined resource, configuration information of a first physical downlink control channel is added to the RAR message, and the first physical downlink control channel is sent according to the configuration information of the physical downlink control channel, thereby implementing sending of a physical downlink control channel, and resolving a problem that when narrowband user equipment works in a system whose system bandwidth is greater than an operating bandwidth of the narrowband user equipment, transmission of a physical downlink control channel cannot be implemented. The physical downlink control channel includes but is not limited to a PDCCH channel and/or an EPDCCH channel.

Figure 3:
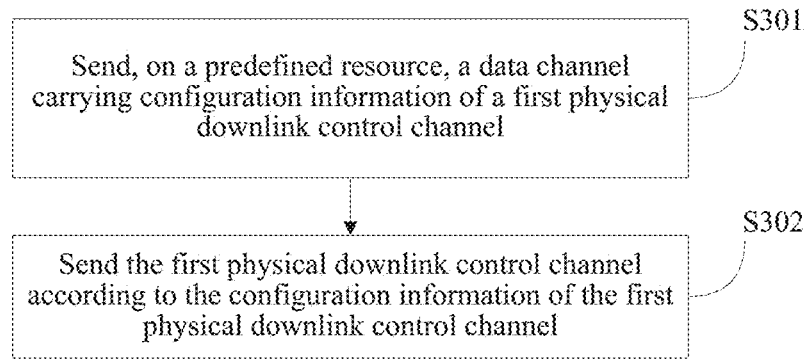
FIG. 3 is a schematic flowchart of still another physical downlink control channel sending method according to an embodiment of the present disclosure.

FIG. 3 is a schematic flowchart of still another physical downlink control channel sending method according to an embodiment of the present disclosure. The method is implemented in a base station device, and includes a specific implementation process of solution 2 mentioned in the embodiment corresponding to FIG. 1. As shown in the figure, a process of the physical downlink control channel sending method in this embodiment may include the following steps.

S301: Send, on a predefined resource, a data channel carrying configuration information of a first physical downlink control channel.

The data channel is sent in an unscheduled manner. It should be noted that the existing data channel is sent in a scheduled manner. In this embodiment of the present disclosure, the scheduled manner is not used, for example, a pre-known modulation and coding scheme or a manner without feedback is used. Specifically, the base station device sends, on the predefined resource, the data channel carrying the configuration information of the first physical downlink control channel.

It should be noted that sending a data channel refers to sending data of the data channel on the data channel.

Optionally, the data channel in this solution may be a random access contention resolution message. That is, the base station device sends the random access contention resolution message on the predefined resource, and adds the configuration information of the first physical downlink control channel to the random access contention resolution message. In this embodiment, a method for transmitting a message before the random access contention resolution message is not limited, and a manner of determining the predefined resource is not limited. For example, information about the predefined resource is determined in a manner of notification by using a system message or a random access response message, or in a manner of determining by using a pre-known rule.

In an optional example, an implementation scenario of this solution may be as follows.

The base station device sends, on a predefined narrowband resource, a message carrying configuration information of an EPDCCH. A manner of sending the message carrying the configuration information of the EPDCCH may be a modulation and coding scheme. The configuration information of the EPDCCH may be configuration information of a CSS in the EPDCCH on one or more EPDCCH resources, for example, on the predefined narrowband resource, or may be configuration information of a CSS in an EPDCCH on another narrowband resource. The configuration information of the CSS may be, for example, a location of a PRB of the CSS, and/or a size of the PRB, and/or a starting symbol location, and/or a transmission manner (for example, a centralized manner or a distributed manner), and/or a subframe mode.

User equipment receives, on the predefined narrowband resource, the message carrying the configuration information of the CSS in the EPDCCH, obtains the configuration information of the CSS in the EPDCCH according to the received message, and listens to the EPDCCH in a CSS on a narrowband resource of the selected EPDCCH.

A network determines configuration of a CSS in an EPDCCH on one or more EPDCCH resources, sends, on the predefined narrowband resource, a message carrying the determined configuration information of the CSS in the EPDCCH, and sends the EPDCCH in the CSS in the EPDCCH on the selected one or more EPDCCH narrowband resources, so that the user equipment may listen to the EPDCCH in the CSS in the EPDCCH on the same selected EPDCCH narrowband resource.

It should be noted that, the user equipment and the network need to determine the selected EPDCCH narrowband resource according to a same rule, to ensure that the narrowband resource on which the user equipment listens to the EPDCCH is the same as the narrowband resource on which the network sends the EPDCCH.

In addition, optionally, the configuration information of the CSS in the EPDCCH may be configuration information of a USS in the EPDCCH, and this example is not listed.

Especially, the predefined resource may be a resource pre-stipulated in a system or standard, or may be a resource notified by using signaling. The signaling is one or more of RRC common signaling, RRC dedicated signaling, Medium Access Control (MAC) signaling, a MAC control element, a physical control channel, or control information. The predefined resource in this embodiment of the present disclosure may be determined in the following three manners.

Manner 1. The predefined resource is determined by using a preset rule. Optionally, the predefined resource is determined according to a quantity of physical resource blocks in the predefined resource, and the predefined resource includes one or more physical resource blocks. For example, an index of a starting PRB or an ending PRB of the predefined resource is a function of n. In an embodiment, assuming that n PRBs are used to send an RAR message, an index of a starting PRB or an ending PRB of the predefined resource is an integer multiple of n. In another embodiment, the index of the starting PRB or the ending PRB of the predefined resource is an integer multiple of n plus or minus a preset compensation value. Further, if there are multiple predefined resources, for example, 2 or 4, in PRBs starting from a PRB whose index is an integer multiple of 2, information is transmitted only according to a quantity of resources being 2, and in PRBs starting from a PRB whose index is an integer multiple of 4, information is transmitted only according to a quantity of resources being 4. It should be noted that, the predefined resource may be determined uniquely in a specific moment, for example, a predefined resource whose PRB is 2 or 4 may be determined uniquely.

Manner 2. The predefined resource is notified by using higher-layer signaling. For example, many predefined resources are configured in a higher layer, and are notified to the user equipment by using a PBCH channel. It should be noted that, the predefined resource is certain in a specific moment, and related configuration information may be certain and known.

Manner 3. One or more resources are configured by using higher-layer signaling, and the predefined resource is determined from the one or more resources by using a predefined rule. That is, the foregoing manner 1 and manner 2 are combined. A range is determined by using higher-layer signaling, and a specific resource or some specific resources are determined from the range according to a rule.

S302: Send the first physical downlink control channel according to the configuration information of the first physical downlink control channel.

Specifically, the base station device determines a sending parameter according to the configuration information of the first physical downlink control channel, and sends the first physical downlink control channel according to the sending parameter, so that the user equipment receives the first physical downlink control channel.

It should be noted that, if the configuration information of the first physical downlink control channel is predefined, in S301, the configuration information of the first physical downlink control channel does not need to be sent, and the first physical downlink control channel may be sent on the predefined resource.

That "the configuration information of the first physical downlink control channel is predefined" includes that "a part of the configuration information of the first physical downlink control channel is predefined, and a part is configured". That is, the configuration information of the first physical downlink control channel includes first configuration information and second configuration information, the first configuration information and the second configuration information include one or more parameter configurations of the first physical downlink control channel, the first configuration information is predefined, and the second configuration information is configured.

In an optional specific implementation manner:

The random access response message carries the first configuration information of the first physical downlink control channel. Alternatively, the second physical downlink control channel carries the first configuration information of the first physical downlink control channel. For example, the second physical downlink control channel is a control channel used to schedule the random access response message.

The second configuration information of the first physical downlink control channel is predefined in the system or standard. Alternatively, system information carries the second configuration information of the first physical downlink control channel.

As can be seen from the foregoing, in this embodiment of the present disclosure, first, a data channel carrying a first physical downlink control channel is sent on a predefined resource, and the first physical downlink control channel is sent according to configuration information of the physical downlink control channel, thereby implementing sending of a physical downlink control channel, and resolving a problem that when narrowband user equipment works in a system whose system bandwidth is greater than an operating bandwidth of the narrowband user equipment, transmission of a physical downlink control channel cannot be implemented. The physical downlink control channel includes but is not limited to a PDCCH channel and/or an EPDCCH channel.

Figure 4:
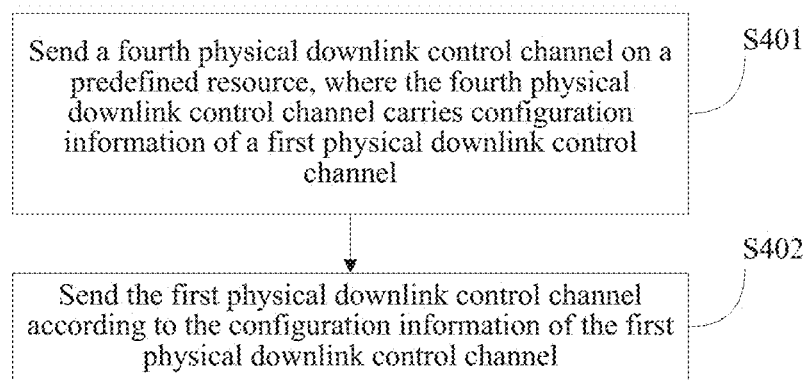
FIG. 4 is a schematic flowchart of still another physical downlink control channel sending method according to an embodiment of the present disclosure.

FIG. 4 is a schematic flowchart of still another physical downlink control channel sending method according to an embodiment of the present disclosure. The method is implemented in a base station device, and includes a specific implementation process of solution 3 mentioned in the embodiment corresponding to FIG. 1. As shown in the figure, a process of the physical downlink control channel sending method in this embodiment may include the following steps.

S401: Send a fourth physical downlink control channel on a predefined resource, where the fourth physical downlink control channel carries configuration information of a first physical downlink control channel.

Optionally, the base station device may first send the fourth physical downlink control channel on the predefined resource, and then, send, according to the fourth physical downlink control channel, a message carrying the configuration information of the first physical downlink control channel. The message carrying the configuration information of the first physical downlink control channel may be a common message, or a user equipment specific message.

Further optionally, the fourth physical downlink control channel in this solution may be a physical downlink control channel used to schedule a random access contention resolution message. That is, the base station device sends, on the predefined resource, the fourth physical downlink control channel used to schedule the random access contention resolution message, receives the random access contention resolution message according to the fourth physical downlink control channel, and adds the configuration information of the first physical downlink control channel to the random access contention resolution message. Similarly, in this solution, a manner of transmitting a channel and a message before the fourth physical downlink control channel is not limited, and a manner of determining the predefined resource is not limited. For example, information about the predefined resource is determined in a manner of notification by using a system message or a random access response message, or in a manner of determining by using a pre-known rule.

In an optional example, an implementation scenario of this solution may be as follows.

The base station device sends a fourth EPDCCH channel on a predefined narrowband resource. Configuration information of a CSS on a physical downlink control channel resource of the fourth EPDCCH is pre-known, that is, the base station device and user equipment already pre-know the configuration information of the CSS on the physical downlink control channel resource of the fourth EPDCCH, for example, a location of a PRB of the CSS, and/or a size of the PRB, and/or a starting symbol location, and/or a transmission manner (for example, a centralized manner or a distributed manner), and/or a subframe mode.

The user equipment receives the fourth EPDCCH channel on the predefined narrowband resource, and obtains the configuration information of the first physical downlink control channel from the received fourth EPDCCH channel; or receives, by using the received fourth EPDCCH channel, a message carrying the configuration information of the first physical downlink control channel.

A network sends the fourth EPDCCH channel on the predefined resource, and adds the configuration information of the first physical downlink control channel to the fourth physical downlink control channel; or sends, according to the fourth physical downlink control channel, a message carrying the configuration information of the first physical downlink control channel.

Especially, the predefined resource may be a resource pre-stipulated in a system or standard, or may be a resource notified by using signaling. The signaling is one or more of RRC common signaling, RRC dedicated signaling, Medium Access Control (MAC) signaling, a MAC control element, a physical control channel, or control information. The predefined resource in this embodiment of the present disclosure may be determined in the following three manners.

Manner 1. The predefined resource is determined by using a preset rule. Optionally, the predefined resource is determined according to a quantity of physical resource blocks in the predefined resource, and the predefined resource includes one or more physical resource blocks. For example, an index of a starting PRB or an ending PRB of the predefined resource is a function of n. In an embodiment, assuming that a CSS in an EPDCCH includes n PRBs, an index of a starting PRB or an ending PRB of the predefined resource is an integer multiple of n. In another embodiment, the index of the starting PRB or the ending PRB of the predefined resource is an integer multiple of n plus or minus a preset compensation value. Further, if there are multiple predefined resources, for example, 2 or 4, in PRBs starting from a PRB whose index is an integer multiple of 2, information is transmitted only according to a quantity of resources being 2, and in PRBs starting from a PRB whose index is an integer multiple of 4, information is transmitted only according to a quantity of resources being 4. It should be noted that, the predefined resource may be determined uniquely in a specific moment, for example, a predefined resource whose PRB is 2 or 4 may be determined uniquely.

Manner 2. The predefined resource is notified by using higher-layer signaling. For example, many predefined resources are configured in a higher layer, and are notified to the user equipment by using a PBCH channel. It should be noted that, the predefined resource is certain in a specific moment, and related configuration information may be certain and known.

Manner 3. One or more resources are configured by using higher-layer signaling, and the predefined resource is determined from the one or more resources by using a predefined rule. That is, the foregoing manner 1 and manner 2 are combined. A range is determined by using higher-layer signaling, and a specific resource or some specific resources are determined from the range according to a rule.

S402: Send the first physical downlink control channel according to the configuration information of the first physical downlink control channel.

Specifically, the base station device determines a sending parameter according to the configuration information of the first physical downlink control channel, and sends the first physical downlink control channel according to the sending parameter, so that the user equipment receives the first physical downlink control channel.

It should be noted that, if the configuration information of the first physical downlink control channel is predefined, in S401, the configuration information of the first physical downlink control channel does not need to be sent, and the first physical downlink control channel may be sent on the predefined resource.

That "the configuration information of the first physical downlink control channel is predefined" includes that "a part of the configuration information of the first physical downlink control channel is predefined, and a part is configured". That is, the configuration information of the first physical downlink control channel includes first configuration information and second configuration information, the first configuration information and the second configuration information include one or more parameter configurations of the first physical downlink control channel, the first configuration information is predefined, and the second configuration information is configured.

In an optional specific implementation manner:

The random access response message carries the first configuration information of the first physical downlink control channel. Alternatively, the second physical downlink control channel carries the first configuration information of the first physical downlink control channel. For example, the second physical downlink control channel is a control channel used to schedule the random access response message.

The second configuration information of the first physical downlink control channel is predefined in the system or standard. Alternatively, system information carries the second configuration information of the first physical downlink control channel.

As can be seen from the foregoing, in this embodiment of the present disclosure, first, configuration information of a fourth physical downlink control channel is sent on a predefined resource, configuration information of a first PDCCH is added to the configuration information of the fourth physical downlink control channel, and the first physical downlink control channel is sent according to the configuration information of the physical downlink control channel, thereby implementing sending of a physical downlink control channel, and resolving a problem that when narrowband user equipment works in a system whose system bandwidth is greater than an operating bandwidth of the narrowband user equipment, transmission of a physical downlink control channel cannot be implemented. The physical downlink control channel includes but is not limited to a PDCCH channel and/or an EPDCCH channel.

Figure 5:
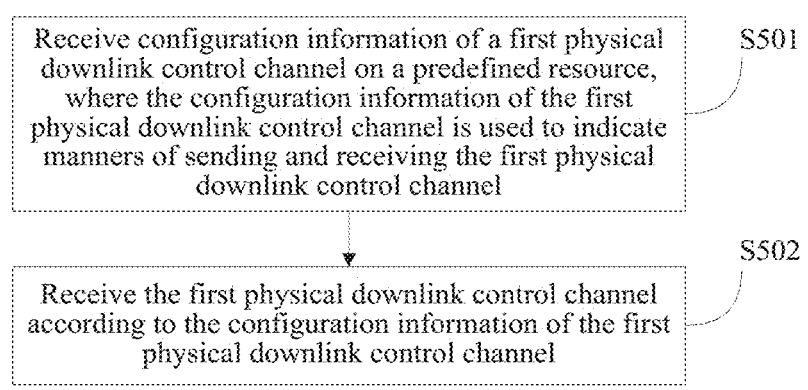
FIG. 5 is a schematic flowchart of a physical downlink control channel receiving method according to an embodiment of the present disclosure.

FIG. 5 is a schematic flowchart of a physical downlink control channel receiving method according to an embodiment of the present disclosure. The method is implemented in user equipment. As shown in the figure, a process of the physical downlink control channel receiving method in this embodiment may include the following steps.

S501: Receive configuration information of a first physical downlink control channel on a predefined resource, where the configuration information of the first physical downlink control channel is used to indicate manners of sending and receiving the first physical downlink control channel.

The predefined resource may be one or more time frequency resources, but is not limited to the time frequency resource. For example, the predefined resource may be a code domain resource, and/or a spatial resource. It should be noted that, this embodiment of the present disclosure is described by using a time frequency resource as an example.

The predefined resource is a part of a predefined narrowband resource, and a physical downlink control channel is a part of the predefined resource on the predefined narrowband resource, or is a part of the predefined resource on another narrowband resource that is not predefined. In an optional embodiment, referring to a schematic diagram, shown in FIG. 13, of a frequency band resource, a relationship among the predefined narrowband resource, another narrowband resource that is not predefined, and the physical downlink control channel is shown in the figure. Predefining refers to: A base station device and the user equipment already predefine configuration information, for example, a location of a resource used for transmission and a quantity of resources used for transmission, and a scrambling sequence used for transmission. It should be understood that the predefined resource and the predefined narrowband resource respectively are a resource whose configuration information is already predefined and a narrowband resource whose configuration information is already predefined.

The physical downlink control channel is a control channel carrying scheduling information. For example, the physical downlink control channel in this embodiment of the present disclosure includes one or more of a PDCCH, an EPDCCH, an RPDCCH, or the like, and especially, refers to an EPDCCH. The method in the present disclosure is described by using an example in which the physical downlink control channel is an EPDCCH. In addition, configuration information of the physical downlink control channel may indicate a transmission manner of the physical downlink control channel, or a manner of transmitting data of the physical downlink control channel on the physical downlink control channel, for example, a location of a resource used for transmission and a quantity of resources used for transmission, a scrambling sequence used for transmission, and configuration of an uplink control channel (PUCCH).

Further, the configuration information of the physical downlink control channel includes configuration information of a common search space (that is, "CSS") in the physical downlink control channel, and/or configuration information of a user equipment specific search space (that is, "USS") in the physical downlink control channel. The physical downlink control channel especially refers to the first physical downlink control channel and a third physical downlink control channel. For example, the configuration information of the first physical downlink control channel includes configuration information of a CSS and/or configuration information of a USS in the first physical downlink control channel, and configuration information of the third physical downlink control channel includes configuration information of a CSS and/or configuration information of a USS in the third physical downlink control channel.

Specifically, the user equipment receives the configuration information of the first physical downlink control channel on the predefined resource. The manner of receiving, by the user equipment, the first physical downlink control channel may be, for example, a location of a resource used to receive the first physical downlink control channel and a quantity of resources used to receive the first physical downlink control channel, and/or a used scrambling sequence, and/or a used uplink control channel resource.

Further, the predefined resource may be a part or all of a physical downlink control channel resource. The physical downlink control channel resource is a set of a resource to which the physical downlink control channel is mapped, and a quantity of the physical downlink control channel resources is one or more. It should be noted that, that "the physical downlink control channel resource is a set of a resource to which the physical downlink control channel is mapped" refers to that "the physical downlink control channel resource is a set of a resource to which the physical downlink control channel may be mapped". For example, the predefined resource is a part of a CSS resource of a pre-known physical downlink control channel. In this embodiment of the present disclosure, other configuration information of a physical downlink control channel resource of the CSS (for example, configuration information of all CSSs in the physical downlink control channel of the CSS, or configuration information of a USS in the physical downlink control channel of the CSS) may be received by using the predefined resource. Furthermore, if one or more physical downlink control channel resources are defined in a communications system, the configuration information of the physical downlink control channel may be used to configure a physical downlink control channel on the one or more physical downlink control channel resources. For example, the predefined resource is a part or all of a CSS resource of a pre-known physical downlink control channel resource. In this embodiment of the present disclosure, physical downlink control channel configuration of one or more physical downlink control channel resources other than the pre-known physical downlink control channel resource may be received on the predefined resource.

Based on the foregoing description, in a specific implementation process, a specific implementation manner of receiving, by the user equipment, the configuration information of the first physical downlink control channel on the predefined resource may be implemented by using the following three solutions.

Solution 1: The user equipment receives a random access response message on the predefined resource, where the random access response message carries the configuration information of the first physical downlink control channel. The "carrying" herein may refer to "including", that is, the random access response message includes the configuration information of the first physical downlink control channel.

Alternatively, the user equipment receives scheduling information of the random access response message on the predefined resource, where the scheduling information of the random access response message is used to indicate manners of sending and receiving the random access response message; and receives the random access response message according to the scheduling information of the random access response message, and obtains the configuration information of the first physical downlink control channel carried in the random access response message. It should be noted that the manner of receiving, by the user equipment, the random access response message may be, for example, a location of a resource block used to receive the random access response message and a quantity of resource blocks used to receive the random access response message, and/or a used modulation and coding scheme. Further, a specific operation of "receiving, by the user equipment, the scheduling information of the random access response message on the predefined resource" may be: first determining, by the user equipment, a common search space on the predefined resource; then, receiving, in the common search space, a second physical downlink control channel used to schedule the random access response message, where the second physical downlink control channel carries the scheduling information of the random access response message. Similarly, the "carrying" herein may also refer to "including".

In the foregoing description, the random access response message is an RAR (Random Access Response) message, and how to send a common message before the RAR is not limited in this embodiment of the present disclosure. For example, how to send a public broadcast channel (PBCH) and a system message (SIB1 (System Information Block), or SI) before the RAR is not limited in the present disclosure. Certainly, the common message before the RAR may be used to configure the predefined resource.

Optionally, the user equipment may implement, by using the following method, an operation of "receiving the random access response message, and obtaining the configuration information of the first physical downlink control channel carried in the random access response message": receiving, by the user equipment, the random access response message, and obtaining indication information carried in the random access response message, where the indication information includes the configuration information of the first physical downlink control channel. In an optional implementation manner, the first physical downlink control channel is used to schedule a random access contention resolution message Msg4, that is, the indication information carried in the random access response message includes configuration information of a physical downlink control channel of the random access contention resolution message Msg4.

Further, optionally, the user equipment may implement, by using the following two manners, an operation of "receiving the random access response message, and obtaining the configuration information of the first physical downlink control channel carried in the random access response message". 1. The user equipment receives the random access response message, and obtains indication information carried in the random access response message, where the indication information includes scheduling information of a random access contention resolution message, and the scheduling information of the random access contention resolution message is used to indicate manners of sending and receiving the random access contention resolution message; and receives the random access contention resolution message, where the random access contention resolution message carries the configuration information of the first physical downlink control channel. Similarly, the "carrying" herein may also refer to "including". 2. The user equipment receives the random access response message, and obtains indication information carried in the random access response message, where the indication information includes configuration information of a third physical downlink control channel, the configuration information of the third physical downlink control channel is used to indicate manners of sending and receiving the third physical downlink control channel, the third physical downlink control channel is used to transmit scheduling information of a random access contention resolution message, the scheduling information of the random access contention resolution message is used to indicate manners of sending and receiving the random access contention resolution message, and the configuration information of the third physical downlink control channel includes configuration information of a common search space in the third physical downlink control channel, and/or configuration information of a user equipment specific search space in a physical downlink control resource of the third physical downlink control channel; and receives the random access contention resolution message according to the scheduling information of the random access contention resolution message, and obtains the configuration information of the first physical downlink control channel carried in the random access contention resolution message.

In the foregoing description, the random access contention resolution message may be an MSG4. The MSG4 may be used to resolve a problem of conflicts in a random access process caused by the fact that the user equipment selects a same random access resource, for example, the user equipment chooses to receive a same random access preamble sequence on a same time frequency resource. It should be noted that, a difference from this embodiment of the present disclosure lies in: According to an existing protocol, the RAR message carries only scheduling information of an MSG3 (that is, a random access procedure message 3), and does not carry scheduling information of the MSG4 or a third physical downlink control channel used to transmit scheduling information of the MSG4.

Further optionally, the base station device may implement, by using the following two manners, an operation of "adding the indication information to the random access response message". 1. The base station device adds a new field to the random access response message, where the new field includes the indication information. 2. The base station device re-explains an existing field in the random access response message, and adds the indication information to the existing field that is re-explained. The re-explaining an existing field is: Re-define usage of some bits of the existing field. In an optional example, referring to a schematic diagram, shown in FIG. 14, of fields of the random access response message, as shown in the figure, a UL Grant field is used to schedule the MSG3, and the field occupies a capacity of 20 bits. However, in a scenario of a narrowband resource, fewer bits than 20 bits are needed to schedule the MSG3. In this embodiment of the present disclosure, the field may be re-explained, only several bits are used to schedule the MSG3, and the remaining bits are used to transmit the indication information.

Similarly, optionally, the base station device may implement, by using the following two manners, an operation of adding the configuration information of the first physical downlink control channel to the random access response message. 1. The base station device adds a new field to the random access response message, where the new field includes the configuration information of the first physical downlink control channel. 2. The base station device re-explains an existing field of the random access response message, and writes the configuration information of the first physical downlink control channel into the existing field that is re-explained.

Solution 2. The user equipment receives, on the predefined resource, a data channel carrying the configuration information of the first physical downlink control channel. The data channel is received in an unscheduled manner. It should be noted that the existing data channel is received in a scheduled manner. In this embodiment of the present disclosure, the scheduled manner is not used, for example, a pre-known modulation and coding scheme or a manner without feedback is used.

It should be noted that receiving a data channel refers to sending data of the data channel on the data channel.

Optionally, the data channel in this solution may be a random access contention resolution message. That is, the base station device receives the random access contention resolution message on the predefined resource, and obtains the configuration information of the first physical downlink control channel carried in the random access contention resolution message. In this embodiment, a method for transmitting a message before the random access contention resolution message is not limited, and a manner of determining the predefined resource is not limited. For example, information about the predefined resource is determined in a manner of notification by using a system message or a random access response message, or in a manner of determining by using a pre-known rule.

In an optional example, an implementation scenario of this solution may be as follows.

The base station device sends, on a predefined narrowband resource, a message carrying configuration information of an EPDCCH. A manner of sending the message carrying the configuration information of the EPDCCH may be a modulation and coding scheme. The configuration information of the EPDCCH may be configuration information of a CSS in the EPDCCH on one or more EPDCCH resources, for example, on the predefined narrowband resource, or may be configuration information of a CSS in an EPDCCH on another narrowband resource. The configuration information of the CSS may be, for example, a location of a PRB of the CSS, and/or a size of the PRB, and/or a starting symbol location, and/or a transmission manner (for example, a centralized manner or a distributed manner), and/or a subframe mode.

The user equipment receives, on the predefined narrowband resource, the message carrying the configuration information of the CSS in the EPDCCH, obtains the configuration information of the CSS in the EPDCCH according to the received message, and listens to the EPDCCH in a CSS on a narrowband resource of the selected EPDCCH.

A network determines configuration of a CSS in an EPDCCH on one or more EPDCCH resources, sends, on the predefined narrowband resource, a message carrying the determined configuration information of the CSS in the EPDCCH, and sends the EPDCCH in the CSS in the EPDCCH on the selected one or more EPDCCH narrowband resources, so that the user equipment may listen to the EPDCCH in the CSS in the EPDCCH on the same selected EPDCCH narrowband resource.

It should be noted that, the user equipment and the network need to determine the selected EPDCCH narrowband resource according to a same rule, to ensure that the narrowband resource on which the user equipment listens to the EPDCCH is the same as the narrowband resource on which the network sends the EPDCCH.

In addition, optionally, the configuration information of the CSS in the EPDCCH may be configuration information of a USS in the EPDCCH, and this example is not listed.

Solution 3. The user equipment receives a fourth physical downlink control channel on the predefined resource, where the fourth physical downlink control channel carries the configuration information of the first physical downlink control channel. Similarly, the "carrying" herein may also refer to "including".

Alternatively, the user equipment receives the fourth physical downlink control channel on the predefined resource, and receives, according to the fourth physical downlink control channel, a message carrying the configuration information of the first physical downlink control channel. The message carrying the configuration information of the first physical downlink control channel may be a common message, or a user equipment specific message.

Optionally, the fourth physical downlink control channel in this solution may be a physical downlink control channel used to schedule a random access contention resolution message. That is, the user equipment receives, on the predefined resource, the fourth physical downlink control channel used to schedule the random access contention resolution message, receives the random access contention resolution message according to the fourth physical downlink control channel, and adds the configuration information of the first physical downlink control channel to the random access contention resolution message. Similarly, in this solution, a manner of transmitting a channel and a message before the fourth physical downlink control channel is not limited, and a manner of determining the predefined resource is not limited. For example, information about the predefined resource is determined in a manner of notification by using a system message or a random access response message, or in a manner of determining by using a pre-known rule.

In an optional example, an implementation scenario of this solution may be as follows.

The base station device sends a fourth EPDCCH channel on a predefined narrowband resource. Configuration information of a CSS on a physical downlink control channel resource of the fourth EPDCCH is pre-known, that is, the base station device and the user equipment already pre-know the configuration information of the CSS on the physical downlink control channel resource of the fourth EPDCCH, for example, a location of a PRB of the CSS, and/or a size of the PRB, and/or a starting symbol location, and/or a transmission manner (for example, a centralized manner or a distributed manner), and/or a subframe mode.

The user equipment receives the fourth EPDCCH channel on the predefined narrowband resource, and obtains the configuration information of the first physical downlink control channel from the received fourth EPDCCH channel; or receives, by using the received fourth EPDCCH channel, a message carrying the configuration information of the first physical downlink control channel.

A network sends the fourth EPDCCH channel on the predefined resource, and adds the configuration information of the first physical downlink control channel to the fourth physical downlink control channel; or sends, according to the fourth physical downlink control channel, a message carrying the configuration information of the first physical downlink control channel.

Especially, in the foregoing solution 1, solution 2, and solution 3, the predefined resource may be a resource pre-stipulated in a system or standard, or may be a resource notified by using signaling. The signaling is one or more of RRC common signaling, RRC dedicated signaling, Medium Access Control (MAC) signaling, a MAC control element, a physical control channel, or control information.

The predefined resource may be determined in the following three manners.

Manner 1. The predefined resource is determined by using a preset rule. Optionally, the predefined resource is determined according to a quantity of physical resource blocks in the predefined resource, and the predefined resource includes one or more physical resource blocks. For example, an index of a starting PRB or an ending PRB of the predefined resource is a function of n. In an embodiment, assuming that in solution 1, n PRBs are used to receive an RAR message, or in solution 2, n PRBs are used to receive configuration information of a CSS in an EPDCCH, or in solution 3, a CSS in an EPDCCH includes n PRB resources, the index of the starting PRB or the ending PRB of the predefined resource is an integer multiple of n. In another embodiment, the index of the starting PRB or the ending PRB of the predefined resource is an integer multiple of n plus or minus a preset compensation value. Further, if there are multiple predefined resources, for example, 2 or 4, in PRBs starting from a PRB whose index is an integer multiple of 2, information is transmitted only according to a quantity of resources being 2, and in PRBs starting from a PRB whose index is an integer multiple of 4, information is transmitted only according to a quantity of resources being 4. It should be noted that, the predefined resource may be determined uniquely in a specific moment, for example, a predefined resource whose PRB is 2 or 4 may be determined uniquely.

Manner 2. The predefined resource is notified by using higher-layer signaling. For example, many predefined resources are configured in a higher layer, and are notified to the user equipment by using a PBCH channel. It should be noted that, the predefined resource is certain in a specific moment, and related configuration information may be certain and known.

Manner 3. One or more resources are configured by using higher-layer signaling, and the predefined resource is determined from the one or more resources by using a predefined rule. That is, the foregoing manner 1 and manner 2 are combined. A range is determined by using higher-layer signaling, and a specific resource or some specific resources are determined from the range according to a rule.

S502: Receive the first physical downlink control channel according to the configuration information of the first physical downlink control channel.

Specifically, the base station device determines a receiving parameter according to the configuration information of the first physical downlink control channel, and receives the first physical downlink control channel according to the receiving parameter.

It should be noted that, if the configuration information of the first physical downlink control channel is predefined, in S501, the configuration information of the first physical downlink control channel does not need to be received, and the first physical downlink control channel may be received on the predefined resource.

That "the configuration information of the first physical downlink control channel is predefined" includes that "a part of the configuration information of the first physical downlink control channel is predefined, and a part is configured". That is, the configuration information of the first physical downlink control channel includes first configuration information and second configuration information, the first configuration information and the second configuration information include one or more parameter configurations of the first physical downlink control channel, the first configuration information is predefined, and the second configuration information is configured.

In an optional specific implementation manner:

The random access response message carries the first configuration information of the first physical downlink control channel. Alternatively, the second physical downlink control channel carries the first configuration information of the first physical downlink control channel. For example, the second physical downlink control channel is a control channel used to schedule the random access response message.

The second configuration information of the first physical downlink control channel is predefined in the system or standard. Alternatively, system information carries the second configuration information of the first physical downlink control channel.

As can be seen from the foregoing, in this embodiment of the present disclosure, first, configuration information of a physical downlink control channel is received on a predefined resource, and the physical downlink control channel is received according to the configuration information of the physical downlink control channel, thereby implementing receiving of a physical downlink control channel, and resolving a problem that when narrowband user equipment works in a system whose system bandwidth is greater than an operating bandwidth of the narrowband user equipment, transmission of a physical downlink control channel cannot be implemented. The physical downlink control channel includes but is not limited to a PDCCH channel and/or an EPDCCH channel.

Figure 6:
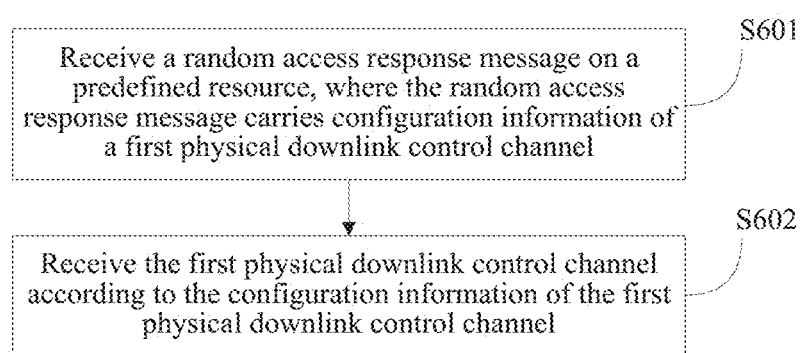
FIG. 6 is a schematic flowchart of another physical downlink control channel receiving method according to an embodiment of the present disclosure.

FIG. 6 is a schematic flowchart of another physical downlink control channel receiving method according to an embodiment of the present disclosure. The method is implemented in user equipment, and includes a specific implementation process of solution 5 mentioned in the embodiment corresponding to FIG. 1. As shown in the figure, a process of the physical downlink control channel receiving method in this embodiment may include the following steps.

S601: Receive a random access response message on a predefined resource, where the random access response message carries configuration information of a first physical downlink control channel.

The random access response message is an RAR (Random Access Response) message, and how to send a common message before the RAR is not limited in this embodiment of the present disclosure. For example, how to send a public broadcast channel (PBCH) and a system message (SIB1 (System Information Block), or SI) before the RAR is not limited in the present disclosure. Certainly, the common message before the RAR may be used to configure the predefined resource.

Specifically, the user equipment receives the random access response message on the predefined resource, where the random access response message carries the configuration information of the first physical downlink control channel. The "carrying" herein may refer to "including", that is, the random access response message includes the configuration information of the first physical downlink control channel.

In an optional implementation manner, the user equipment may first receive scheduling information of the random access response message on the predefined resource, where the scheduling information of the random access response message is used to indicate manners of sending and receiving the random access response message; then, receive the random access response message according to the scheduling information of the random access response message, and obtain the configuration information of the first physical downlink control channel carried in the random access response message. It should be noted that the manner of receiving, by the user equipment, the random access response message may be, for example, a location of a resource block used to receive the random access response message and a quantity of resource blocks used to receive the random access response message, and/or a used modulation and coding scheme. Further, a specific operation of "receiving, by the user equipment, the scheduling information of the random access response message on the predefined resource" may be: first determining, by the user equipment, a common search space on the predefined resource; then, receiving, in the common search space, a second physical downlink control channel used to schedule the random access response message, where the second physical downlink control channel carries the scheduling information of the random access response message. Similarly, the "carrying" herein may also refer to "including".

Optionally, the user equipment may implement, by using the following method, an operation of "receiving the random access response message, and obtaining the configuration information of the first physical downlink control channel carried in the random access response message": receiving, by the user equipment, the random access response message, and obtaining indication information carried in the random access response message, where the indication information includes the configuration information of the first physical downlink control channel. In an optional implementation manner, the first physical downlink control channel is used to schedule a random access contention resolution message Msg4, that is, the indication information carried in the random access response message includes configuration information of a physical downlink control channel of the random access contention resolution message Msg4.

Further, optionally, the user equipment may implement, by using the following two manners, an operation of "receiving the random access response message, and obtaining the configuration information of the first physical downlink control channel carried in the random access response message". 1. The user equipment receives the random access response message, and obtains indication information carried in the random access response message, where the indication information includes scheduling information of a random access contention resolution message, and the scheduling information of the random access contention resolution message is used to indicate manners of sending and receiving the random access contention resolution message; and receives the random access contention resolution message, where the random access contention resolution message carries the configuration information of the first physical downlink control channel. Similarly, the "carrying" herein may also refer to "including". 2. The user equipment receives the random access response message, and obtains indication information carried in the random access response message, where the indication information includes configuration information of a third physical downlink control channel, the configuration information of the third physical downlink control channel is used to indicate manners of sending and receiving the third physical downlink control channel, the third physical downlink control channel is used to transmit scheduling information of a random access contention resolution message, the scheduling information of the random access contention resolution message is used to indicate manners of sending and receiving the random access contention resolution message, and the configuration information of the third physical downlink control channel includes configuration information of a common search space in the third physical downlink control channel, and/or configuration information of a user equipment specific search space in a physical downlink control resource of the third physical downlink control channel; and receives the random access contention resolution message according to the scheduling information of the random access contention resolution message, and obtains the configuration information of the first physical downlink control channel carried in the random access contention resolution message.

In the foregoing description, the random access contention resolution message may be an MSG4. The MSG4 may be used to resolve a problem of conflicts in a random access process caused by the fact that the user equipment selects a same random access resource, for example, the user equipment chooses to receive a same random access preamble sequence on a same time frequency resource. It should be noted that, a difference from this embodiment of the present disclosure lies in: According to an existing protocol, the RAR message carries only scheduling information of an MSG3 (that is, a random access procedure message 3), and does not carry scheduling information of the MSG4 or a third physical downlink control channel used to transmit scheduling information of the MSG4.

Further optionally, the base station device may implement, by using the following two manners, an operation of "adding the indication information to the random access response message". 1. The base station device adds a new field to the random access response message, where the new field includes the indication information. 2. The base station device re-explains an existing field in the random access response message, and adds the indication information to the existing field that is re-explained. The re-explaining an existing field is: Re-define usage of some bits of the existing field. In an optional example, referring to a schematic diagram, shown in FIG. 14, of fields of the random access response message, as shown in the figure, a UL Grant field is used to schedule the MSG3, and the field occupies a capacity of 20 bits. However, in a scenario of a narrowband resource, fewer bits than 20 bits are needed to schedule the MSG3. In this embodiment of the present disclosure, the field may be re-explained, only several bits are used to schedule the MSG3, and the remaining bits are used to transmit the indication information.

Similarly, optionally, the base station device may implement, by using the following two manners, an operation of adding the configuration information of the first physical downlink control channel to the random access response message. 1. The base station device adds a new field to the random access response message, where the new field includes the configuration information of the first physical downlink control channel. 2. The base station device re-explains an existing field of the random access response message, and writes the configuration information of the first physical downlink control channel into the existing field that is re-explained.

Especially, the predefined resource may be a resource pre-stipulated in a system or standard, or may be a resource notified by using signaling. The signaling is one or more of RRC common signaling, RRC dedicated signaling, Medium Access Control (MAC) signaling, a MAC control element, a physical control channel, or control information. The predefined resource in this embodiment of the present disclosure may be determined in the following three manners.

Manner 1. The predefined resource is determined by using a preset rule. Optionally, the predefined resource is determined according to a quantity of physical resource blocks in the predefined resource, and the predefined resource includes one or more physical resource blocks. For example, an index of a starting PRB or an ending PRB of the predefined resource is a function of n. In an embodiment, assuming that n PRBs are used to receive an RAR message, an index of a starting PRB or an ending PRB of the predefined resource is an integer multiple of n. In another embodiment, the index of the starting PRB or the ending PRB of the predefined resource is an integer multiple of n plus or minus a preset compensation value. Further, if there are multiple predefined resources, for example, 2 or 4, in PRBs starting from a PRB whose index is an integer multiple of 2, information is transmitted only according to a quantity of resources being 2, and in PRBs starting from a PRB whose index is an integer multiple of 4, information is transmitted only according to a quantity of resources being 4. It should be noted that, the predefined resource may be determined uniquely in a specific moment, for example, a predefined resource whose PRB is 2 or 4 may be determined uniquely.

Manner 2. The predefined resource is notified by using higher-layer signaling. For example, many predefined resources are configured in a higher layer, and are notified to the user equipment by using a PBCH channel. It should be noted that, the predefined resource is certain in a specific moment, and related configuration information may be certain and known.

Manner 3. One or more resources are configured by using higher-layer signaling, and the predefined resource is determined from the one or more resources by using a predefined rule. That is, the foregoing manner 1 and manner 2 are combined. A range is determined by using higher-layer signaling, and a specific resource or some specific resources are determined from the range according to a rule.

S602: Receive the first physical downlink control channel according to the configuration information of the first physical downlink control channel.

Specifically, the user equipment determines a receiving parameter according to the configuration information of the first physical downlink control channel, and receives the first physical downlink control channel according to the receiving parameter.

It should be noted that, if the configuration information of the first physical downlink control channel is predefined, in S601, the configuration information of the first physical downlink control channel does not need to be received, and the first physical downlink control channel may be received on the predefined resource.

That "the configuration information of the first physical downlink control channel is predefined" includes that "a part of the configuration information of the first physical downlink control channel is predefined, and a part is configured". That is, the configuration information of the first physical downlink control channel includes first configuration information and second configuration information, the first configuration information and the second configuration information include one or more parameter configurations of the first physical downlink control channel, the first configuration information is predefined, and the second configuration information is configured.

In an optional specific implementation manner:

The random access response message carries the first configuration information of the first physical downlink control channel. Alternatively, the second physical downlink control channel carries the first configuration information of the first physical downlink control channel. For example, the second physical downlink control channel is a control channel used to schedule the random access response message.

The second configuration information of the first physical downlink control channel is predefined in the system or standard. Alternatively, system information carries the second configuration information of the first physical downlink control channel.

As can be seen from the foregoing, in this embodiment of the present disclosure, first, an RAR message is received on a predefined resource, configuration information of a first physical downlink control channel carried in the RAR message is obtained, and the first physical downlink control channel is received according to the configuration information of the first physical downlink control channel, thereby implementing receiving of a physical downlink control channel, and resolving a problem that when narrowband user equipment works in a system whose system bandwidth is greater than an operating bandwidth of the narrowband user equipment, transmission of a physical downlink control channel cannot be implemented. The physical downlink control channel includes but is not limited to a PDCCH channel and/or an EPDCCH channel.

Figure 7:
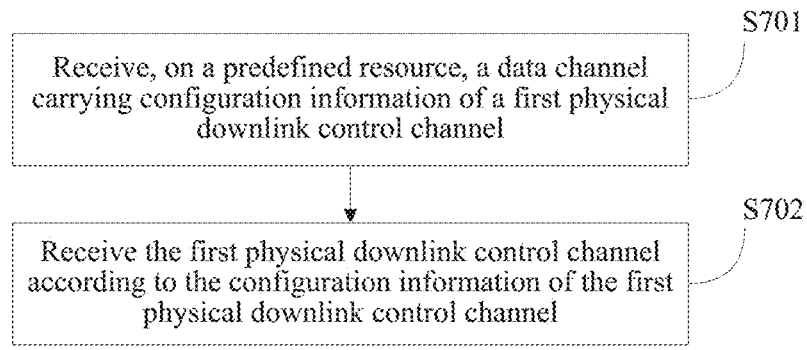
FIG. 7 is a schematic flowchart of still another physical downlink control channel receiving method according to an embodiment of the present disclosure.

FIG. 7 is a schematic flowchart of still another physical downlink control channel receiving method according to an embodiment of the present disclosure. The method is implemented in user equipment, and includes a specific implementation process of solution 2 mentioned in the embodiment corresponding to FIG. 5. As shown in the figure, a process of the physical downlink control channel receiving method in this embodiment may include the following steps.

S701: Receive, on a predefined resource, a data channel carrying configuration information of a first physical downlink control channel.

The data channel is received in an unscheduled manner. It should be noted that the existing data channel is received in a scheduled manner. In this embodiment of the present disclosure, the scheduled manner is not used, for example, a pre-known modulation and coding scheme or a manner without feedback is used. Specifically, the user equipment receives, on the predefined resource, the data channel carrying the configuration information of the first physical downlink control channel.

It should be noted that receiving a data channel refers to receiving data of the data channel on the data channel.

Optionally, the data channel in this solution may be a random access contention resolution message. That is, the base station device receives the random access contention resolution message on the predefined resource, and obtains the configuration information of the first physical downlink control channel carried in the random access contention resolution message. In this embodiment, a method for transmitting a message before the random access contention resolution message is not limited, and a manner of determining the predefined resource is not limited. For example, information about the predefined resource is determined in a manner of notification by using a system message or a random access response message, or in a manner of determining by using a pre-known rule.

In an optional example, an implementation scenario of this solution may be as follows.

The base station device sends, on a predefined narrowband resource, a message carrying configuration information of an EPDCCH. A manner of sending the message carrying the configuration information of the EPDCCH may be a modulation and coding scheme. The configuration information of the EPDCCH may be configuration information of a CSS in the EPDCCH on one or more EPDCCH resources, for example, on the predefined narrowband resource, or may be configuration information of a CSS in an EPDCCH on another narrowband resource. The configuration information of the CSS may be, for example, a location of a PRB of the CSS, and/or a size of the PRB, and/or a starting symbol location, and/or a transmission manner (for example, a centralized manner or a distributed manner), and/or a subframe mode.

The user equipment receives, on the predefined narrowband resource, the message carrying the configuration information of the CSS in the EPDCCH, obtains the configuration information of the CSS according to the received message of the EPDCCH, and listens to the EPDCCH in a CSS on a narrowband resource of a selected EPDCCH.

A network determines configuration of a CSS in an EPDCCH on one or more EPDCCH resources, sends, on the predefined narrowband resource, a message carrying the determined configuration information of the CSS in the EPDCCH, and sends the EPDCCH in the CSS in the EPDCCH on the selected one or more EPDCCH narrowband resources, so that the user equipment may listen to the EPDCCH in the CSS in the EPDCCH on the same selected EPDCCH narrowband resource.

It should be noted that, the user equipment and the network need to determine the selected EPDCCH narrowband resource according to a same rule, to ensure that the narrowband resource on which the user equipment listens to the EPDCCH is the same as the narrowband resource on which the network sends the EPDCCH.

In addition, optionally, the configuration information of the CSS in the EPDCCH may be configuration information of a USS in the EPDCCH, and this example is not listed.

Especially, the predefined resource may be a resource pre-stipulated in a system or standard, or may be a resource notified by using signaling. The signaling is one or more of RRC common signaling, RRC dedicated signaling, Medium Access Control (MAC) signaling, a MAC control element, a physical control channel, or control information. The predefined resource in this embodiment of the present disclosure may be determined in the following three manners.

Manner 1. The predefined resource is determined by using a preset rule. Optionally, the predefined resource is determined according to a quantity of physical resource blocks in the predefined resource, and the predefined resource includes one or more physical resource blocks. For example, an index of a starting PRB or an ending PRB of the predefined resource is a function of n. In an embodiment, assuming that n PRBs are used to receive configuration information of a CSS in an EPDCCH, an index of a starting PRB or an ending PRB of the predefined resource is an integer multiple of n. In another embodiment, the index of the starting PRB or the ending PRB of the predefined resource is an integer multiple of n plus or minus a preset compensation value. Further, if there are multiple predefined resources, for example, 2 or 4, in PRBs starting from a PRB whose index is an integer multiple of 2, information is transmitted only according to a quantity of resources being 2, and in PRBs starting from a PRB whose index is an integer multiple of 4, information is transmitted only according to a quantity of resources being 4. It should be noted that, the predefined resource may be determined uniquely in a specific moment, for example, a predefined resource whose PRB is 2 or 4 may be determined uniquely.

Manner 2. The predefined resource is notified by using higher-layer signaling. For example, many predefined resources are configured in a higher layer, and are notified to the user equipment by using a PBCH channel. It should be noted that, the predefined resource is certain in a specific moment, and related configuration information may be certain and known.

Manner 3. One or more resources are configured by using higher-layer signaling, and the predefined resource is determined from the one or more resources by using a predefined rule. That is, the foregoing manner 1 and manner 2 are combined. A range is determined by using higher-layer signaling, and a specific resource or some specific resources are determined from the range according to a rule.

S702: Receive the first physical downlink control channel according to the configuration information of the first physical downlink control channel.

Specifically, the user equipment determines a receiving parameter according to the configuration information of the first physical downlink control channel, and receives the first physical downlink control channel according to the receiving parameter.

It should be noted that, if the configuration information of the first physical downlink control channel is predefined, in S701, the configuration information of the first physical downlink control channel does not need to be received, and the first physical downlink control channel may be received on the predefined resource.

That "the configuration information of the first physical downlink control channel is predefined" includes that "a part of the configuration information of the first physical downlink control channel is predefined, and a part is configured". That is, the configuration information of the first physical downlink control channel includes first configuration information and second configuration information, the first configuration information and the second configuration information include one or more parameter configurations of the first physical downlink control channel, the first configuration information is predefined, and the second configuration information is configured.

In an optional specific implementation manner:

The random access response message carries the first configuration information of the first physical downlink control channel. Alternatively, the second physical downlink control channel carries the first configuration information of the first physical downlink control channel. For example, the second physical downlink control channel is a control channel used to schedule the random access response message.

The second configuration information of the first physical downlink control channel is predefined in the system or standard. Alternatively, system information carries the second configuration information of the first physical downlink control channel.

As can be seen from the foregoing, in this embodiment of the present disclosure, first, a data channel carrying a physical downlink control channel is received on a predefined resource, and the first physical downlink control channel is received according to configuration information of the physical downlink control channel, thereby implementing receiving of a physical downlink control channel, and resolving a problem that when narrowband user equipment works in a system whose system bandwidth is greater than an operating bandwidth of the narrowband user equipment, transmission of a physical downlink control channel cannot be implemented. The physical downlink control channel includes but is not limited to a PDCCH channel and/or an EPDCCH channel.

Figure 8:
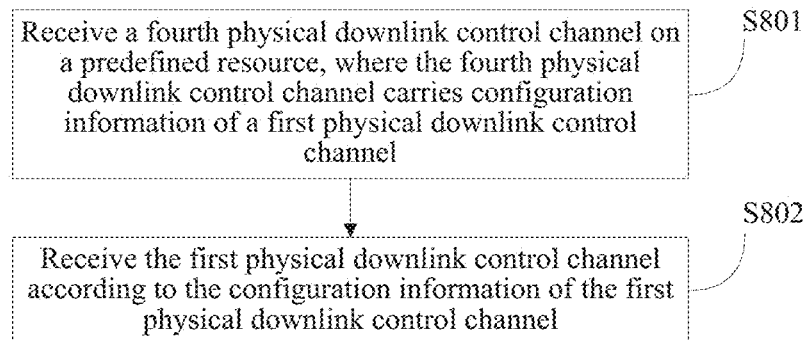
FIG. 8 is a schematic flowchart of still another physical downlink control channel receiving method according to an embodiment of the present disclosure.

FIG. 8 is a schematic flowchart of still another physical downlink control channel receiving method according to an embodiment of the present disclosure. The method is implemented in user equipment, and includes a specific implementation process of solution 3 mentioned in the embodiment corresponding to FIG. 5. As shown in the figure, a process of the physical downlink control channel receiving method in this embodiment may include the following steps.

S801: Receive a fourth physical downlink control channel on a predefined resource, where the fourth physical downlink control channel carries configuration information of a first physical downlink control channel.

Optionally, the user equipment may first receive the fourth physical downlink control channel on the predefined resource, and then, receive, according to the fourth physical downlink control channel, a message carrying the configuration information of the first physical downlink control channel. The message carrying the configuration information of the first physical downlink control channel may be a common message, or a user equipment specific message.

Further optionally, the fourth physical downlink control channel in this solution may be a physical downlink control channel used to schedule a random access contention resolution message. That is, the user equipment receives, on the predefined resource, the fourth physical downlink control channel used to schedule the random access contention resolution message, receives the random access contention resolution message according to the fourth physical downlink control channel, and adds the configuration information of the first physical downlink control channel to the random access contention resolution message. Similarly, in this solution, a manner of transmitting a channel and a message before the fourth physical downlink control channel is not limited, and a manner of determining the predefined resource is not limited. For example, information about the predefined resource is determined in a manner of notification by using a system message or a random access response message, or in a manner of determining by using a pre-known rule.

In an optional example, an implementation scenario of this solution may be as follows.

The base station device sends a fourth EPDCCH channel on a predefined narrowband resource. Configuration information of a CSS on a physical downlink control channel resource of the fourth EPDCCH is pre-known, that is, the base station device and the user equipment already pre-know the configuration information of the CSS on the physical downlink control channel resource of the fourth EPDCCH, for example, a location of a PRB of the CSS, and/or a size of the PRB, and/or a starting symbol location, and/or a transmission manner (for example, a centralized manner or a distributed manner), and/or a subframe mode.

The user equipment receives the fourth EPDCCH channel on the predefined narrowband resource, and obtains the configuration information of the first physical downlink control channel from the received fourth EPDCCH channel; or receives, by using the received fourth EPDCCH channel, a message carrying the configuration information of the first physical downlink control channel.

A network sends the fourth EPDCCH channel on the predefined resource, and adds the configuration information of the first physical downlink control channel to the fourth physical downlink control channel; or sends, according to the fourth physical downlink control channel, a message carrying the configuration information of the first physical downlink control channel.

Especially, the predefined resource may be a resource pre-stipulated in a system or standard, or may be a resource notified by using signaling. The signaling is one or more of RRC common signaling, RRC dedicated signaling, Medium Access Control (MAC) signaling, a MAC control element, a physical control channel, or control information. The predefined resource in this embodiment of the present disclosure may be determined in the following three manners.

Manner 1. The predefined resource is determined by using a preset rule. Optionally, the predefined resource is determined according to a quantity of physical resource blocks in the predefined resource, and the predefined resource includes one or more physical resource blocks. For example, an index of a starting PRB or an ending PRB of the predefined resource is a function of n. In an embodiment, assuming that a CSS in an EPDCCH includes n PRBs, an index of a starting PRB or an ending PRB of the predefined resource is an integer multiple of n. In another embodiment, the index of the starting PRB or the ending PRB of the predefined resource is an integer multiple of n plus or minus a preset compensation value. Further, if there are multiple predefined resources, for example, 2 or 4, in PRBs starting from a PRB whose index is an integer multiple of 2, information is transmitted only according to a quantity of resources being 2, and in PRBs starting from a PRB whose index is an integer multiple of 4, information is transmitted only according to a quantity of resources being 4. It should be noted that, the predefined resource may be determined uniquely in a specific moment, for example, a predefined resource whose PRB is 2 or 4 may be determined uniquely.

Manner 2. The predefined resource is notified by using higher-layer signaling. For example, many predefined resources are configured in a higher layer, and are notified to the user equipment by using a PBCH channel. It should be noted that, the predefined resource is certain in a specific moment, and related configuration information may be certain and known.

Manner 3. One or more resources are configured by using higher-layer signaling, and the predefined resource is determined from the one or more resources by using a predefined rule. That is, the foregoing manner 1 and manner 2 are combined. A range is determined by using higher-layer signaling, and a specific resource or some specific resources are determined from the range according to a rule.

S802: Receive the first physical downlink control channel according to the configuration information of the first physical downlink control channel.

Specifically, the user equipment determines a receiving parameter according to the configuration information of the first physical downlink control channel, and receives the first physical downlink control channel according to the receiving parameter.

It should be noted that, if the configuration information of the first physical downlink control channel is predefined, in S801, the configuration information of the first physical downlink control channel does not need to be received, and the first physical downlink control channel may be received on the predefined resource.

That "the configuration information of the first physical downlink control channel is predefined" includes that "a part of the configuration information of the first physical downlink control channel is predefined, and a part is configured". That is, the configuration information of the first physical downlink control channel includes first configuration information and second configuration information, the first configuration information and the second configuration information include one or more parameter configurations of the first physical downlink control channel, the first configuration information is predefined, and the second configuration information is configured.

In an optional specific implementation manner:

The random access response message carries the first configuration information of the first physical downlink control channel. Alternatively, the second physical downlink control channel carries the first configuration information of the first physical downlink control channel. For example, the second physical downlink control channel is a control channel used to schedule the random access response message.

The second configuration information of the first physical downlink control channel is predefined in the system or standard. Alternatively, system information carries the second configuration information of the first physical downlink control channel.

As can be seen from the foregoing, in this embodiment of the present disclosure, first, configuration information of a fourth physical downlink control channel is received on a predefined resource, configuration information of a first PDCCH carried in the configuration information of the fourth physical downlink control channel is obtained, and the first physical downlink control channel is received according to the configuration information of the physical downlink control channel, thereby implementing receiving of a physical downlink control channel, and resolving a problem that when narrowband user equipment works in a system whose system bandwidth is greater than an operating bandwidth of the narrowband user equipment, transmission of a physical downlink control channel cannot be implemented. The physical downlink control channel includes but is not limited to a PDCCH channel and/or an EPDCCH channel.

Figure 9:
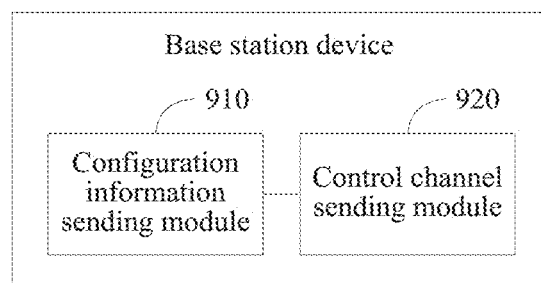
FIG. 9 is a schematic structural diagram of a base station device according to an embodiment of the present disclosure.

FIG. 9 is a schematic structural diagram of a base station device according to an embodiment of the present disclosure. As shown in the figure, the base station device in this embodiment of the present disclosure may include at least a configuration information sending module 910 and a control channel sending module 920.

The configuration information sending module 910 is configured to send configuration information of a first physical downlink control channel on a predefined resource, where the configuration information of the first physical downlink control channel is used to indicate manners of sending and receiving the first physical downlink control channel.

The predefined resource may be one or more time frequency resources, but is not limited to the time frequency resource. For example, the predefined resource may be a code domain resource, and/or a spatial resource. It should be noted that, this embodiment of the present disclosure is described by using a time frequency resource as an example.

The predefined resource is a part of a predefined narrowband resource, and a physical downlink control channel is a part of the predefined resource on the predefined narrowband resource, or is a part of the predefined resource on another narrowband resource that is not predefined. In an optional embodiment, referring to a schematic diagram, shown in FIG. 13, of a frequency band resource, a relationship among the predefined narrowband resource, another narrowband resource that is not predefined, and the physical downlink control channel is shown in the figure. Predefining refers to: The base station device and user equipment already predefine configuration information, for example, a location of a resource used for transmission and a quantity of resources used for transmission, and a scrambling sequence used for transmission. It should be understood that the predefined resource and the predefined narrowband resource respectively are a resource whose configuration information is already predefined and a narrowband resource whose configuration information is already predefined.

The physical downlink control channel is a control channel carrying scheduling information. For example, the physical downlink control channel in this embodiment of the present disclosure includes one or more of a PDCCH, an EPDCCH, an RPDCCH, or the like, and especially, refers to an EPDCCH. The method in the present disclosure is described by using an example in which the physical downlink control channel is an EPDCCH. In addition, configuration information of the physical downlink control channel may indicate a transmission manner of the physical downlink control channel, or a manner of transmitting data of the physical downlink control channel on the physical downlink control channel, for example, a location of a resource used for transmission and a quantity of resources used for transmission, a scrambling sequence used for transmission, and configuration of an uplink control channel (PUCCH).

Further, the configuration information of the physical downlink control channel includes configuration information of a common search space (that is, "CSS") in the physical downlink control channel, and/or configuration information of a user equipment specific search space (that is, "USS") in the physical downlink control channel. The physical downlink control channel especially refers to the first physical downlink control channel and a third physical downlink control channel. For example, the configuration information of the first physical downlink control channel includes configuration information of a CSS and/or configuration information of a USS in the first physical downlink control channel, and configuration information of the third physical downlink control channel includes configuration information of a CSS and/or configuration information of a USS in the third physical downlink control channel.

Specifically, the configuration information sending module 910 sends the configuration information of the first physical downlink control channel on the predefined resource. The configuration information of the first physical downlink control channel is used to indicate the manners of sending and receiving the first physical downlink control channel. The manner of receiving, by the user equipment, the first physical downlink control channel may be, for example, a location of a resource used to receive the first physical downlink control channel and a quantity of resources used to receive the first physical downlink control channel, and/or a used scrambling sequence, and/or a used uplink control channel resource.

Further, the predefined resource may be a part or all of a physical downlink control channel resource. The physical downlink control channel resource is a set of a resource to which the physical downlink control channel is mapped, and a quantity of the physical downlink control channel resources is one or more. It should be noted that, that "the physical downlink control channel resource is a set of a resource to which the physical downlink control channel is mapped" refers to that "the physical downlink control channel resource is a set of a resource to which the physical downlink control channel may be mapped". For example, the predefined resource is a part of a CSS resource of a pre-known physical downlink control channel. In this embodiment of the present disclosure, other configuration information of a physical downlink control channel resource of the CSS (for example, configuration information of all CSSs in the physical downlink control channel of the CSS, or configuration information of a USS in the physical downlink control channel of the CSS) may be sent by using the predefined resource. Furthermore, if one or more physical downlink control channel resources are defined in a communications system, the configuration information of the physical downlink control channel may be used to configure a physical downlink control channel on the one or more physical downlink control channel resources. For example, the predefined resource is a part or all of a CSS resource of a pre-known physical downlink control channel resource. In this embodiment of the present disclosure, physical downlink control channel configuration of one or more physical downlink control channel resources other than the pre-known physical downlink control channel resource may be sent on the predefined resource.

Based on the foregoing description, in a specific implementation process, a specific implementation manner of sending, by the configuration information sending module 910, the configuration information of the first physical downlink control channel on the predefined resource may be implemented by using the following three solutions.

Solution 1: The configuration information sending module 910 sends a random access response message on the predefined resource, where the random access response message carries the configuration information of the first physical downlink control channel. The "carrying" herein may refer to "including", that is, the random access response message includes the configuration information of the first physical downlink control channel.

Alternatively, the configuration information sending module 910 sends scheduling information of the random access response message on the predefined resource, where the scheduling information of the random access response message is used to indicate manners of sending and receiving the random access response message; and sends the random access response message according to the scheduling information of the random access response message, and adds the configuration information of the first physical downlink control channel to the random access response message. It should be noted that the manner of receiving, by the user equipment, the random access response message may be, for example, a location of a resource block used to receive the random access response message and a quantity of resource blocks used to receive the random access response message, and/or a used modulation and coding scheme. Further, a specific operation of "sending, by the configuration information sending module 910, the scheduling information of the random access response message on the predefined resource" may be: first determining, by the configuration information sending module 910, a common search space on the predefined resource; then, sending, in the common search space, a second physical downlink control channel used to schedule the random access response message, where the second physical downlink control channel carries the scheduling information of the random access response message. Similarly, the "carrying" herein may also refer to "including".

In the foregoing description, the random access response message is an RAR (Random Access Response) message, and how to send a common message before the RAR is not limited in this embodiment of the present disclosure. For example, how to send a public broadcast channel (PBCH) and a system message (SIB1 (System Information Block), or SI) before the RAR is not limited in the present disclosure. Certainly, the common message before the RAR may be used to configure the predefined resource.

Optionally, the configuration information sending module 910 may implement, by using the following method, an operation of "sending the random access response message, and adding the configuration information of the first physical downlink control channel to the random access response message": sending, by the configuration information sending module 910, the random access response message, and adding indication information to the random access response message, where the indication information includes the configuration information of the first physical downlink control channel. In an optional implementation manner, the first physical downlink control channel is used to schedule a random access contention resolution message Msg4, that is, the indication information carried in the random access response message includes configuration information of a physical downlink control channel of the random access contention resolution message Msg4.

Further, optionally, the configuration information sending module 910 may implement, by using the following two manners, an operation of "sending the random access response message, and adding the configuration information of the first physical downlink control channel to the random access response message". 1. The configuration information sending module 910 sends the random access response message, and adds indication information to the random access response message, where the indication information includes scheduling information of a random access contention resolution message, and the scheduling information of the random access contention resolution message is used to indicate manners of sending and receiving the random access contention resolution message; and sends the random access contention resolution message, where the random access contention resolution message carries the configuration information of the first physical downlink control channel. Similarly, the "carrying" herein may also refer to "including". 2. The configuration information sending module 910 sends the random access response message, and adds indication information to the random access response message, where the indication information includes configuration information of a third physical downlink control channel, the configuration information of the third physical downlink control channel is used to indicate manners of sending and receiving the third physical downlink control channel, the third physical downlink control channel is used to transmit scheduling information of a random access contention resolution message, the scheduling information of the random access contention resolution message is used to indicate manners of sending and receiving the random access contention resolution message, and the configuration information of the third physical downlink control channel includes configuration information of a common search space in the third physical downlink control channel, and/or configuration information of a user equipment specific search space in a physical downlink control resource of the third physical downlink control channel; and sends the random access contention resolution message, where the random access contention resolution message carries the configuration information of the first physical downlink control channel.

In the foregoing description, the random access contention resolution message may be an MSG4. The MSG4 may be used to resolve a problem of conflicts in a random access process caused by the fact that the user equipment selects a same random access resource, for example, the user equipment chooses to send a same random access preamble sequence on a same time frequency resource. It should be noted that, a difference from this embodiment of the present disclosure lies in: According to an existing protocol, the RAR message carries only scheduling information of an MSG3 (that is, a random access procedure message 3), and does not carry scheduling information of the MSG4 or a third physical downlink control channel used to transmit scheduling information of the MSG4.

Further optionally, the configuration information sending module 910 may implement, by using the following two manners, an operation of "adding the indication information to the random access response message". 1. The configuration information sending module 910 adds a new field to the random access response message, where the new field includes the indication information. 2. The configuration information sending module 910 re-explains an existing field in the random access response message, and adds the indication information to the existing field that is re-explained. The re-explaining an existing field is: Re-define usage of some bits of the existing field. In an optional example, referring to a schematic diagram, shown in FIG. 14, of fields of the random access response message, as shown in the figure, a UL Grant field is used to schedule the MSG3, and the field occupies a capacity of 20 bits. However, in a scenario of a narrowband resource, fewer bits than 20 bits are needed to schedule the MSG3. In this embodiment of the present disclosure, the field may be re-explained, only several bits are used to schedule the MSG3, and the remaining bits are used to transmit the indication information.

Similarly, optionally, the configuration information sending module 910 may implement, by using the following two manners, an operation of "adding the configuration information of the first physical downlink control channel to the random access response message". 1. The configuration information sending module 910 adds a new field to the random access response message, where the new field includes the configuration information of the first physical downlink control channel. 2. The configuration information sending module 910 re-explains an existing field of the random access response message, and writes the configuration information of the first physical downlink control channel into the existing field that is re-explained.

Solution 2. The configuration information sending module 910 sends, on the predefined resource, a data channel carrying the configuration information of the first physical downlink control channel. The data channel is sent in an unscheduled manner. It should be noted that the existing data channel is sent in a scheduled manner. In this embodiment of the present disclosure, the scheduled manner is not used, for example, a pre-known modulation and coding scheme or a manner without feedback is used.

It should be noted that sending a data channel refers to sending data of the data channel on the data channel.

Optionally, the data channel in this solution may be a random access contention resolution message. That is, the configuration information sending module 910 sends the random access contention resolution message on the predefined resource, and adds the configuration information of the first physical downlink control channel to the random access contention resolution message. In this embodiment, a method for transmitting a message before the random access contention resolution message is not limited, and a manner of determining the predefined resource is not limited. For example, information about the predefined resource is determined in a manner of notification by using a system message or a random access response message, or in a manner of determining by using a pre-known rule.

In an optional example, an implementation scenario of this solution may be as follows.

The configuration information sending module 910 sends, on a predefined narrowband resource, a message carrying configuration information of an EPDCCH. A manner of sending the message carrying the configuration information of the EPDCCH may be a modulation and coding scheme. The configuration information of the EPDCCH may be configuration information of a CSS in the EPDCCH on one or more EPDCCH resources, for example, on the predefined narrowband resource, or may be configuration information of a CSS in an EPDCCH on another narrowband resource. The configuration information of the CSS may be, for example, a location of a PRB of the CSS, and/or a size of the PRB, and/or a starting symbol location, and/or a transmission manner (for example, a centralized manner or a distributed manner), and/or a subframe mode.

The user equipment receives, on the predefined narrowband resource, the message carrying the configuration information of the CSS in the EPDCCH, obtains the configuration information of the CSS in the EPDCCH according to the received message, and listens to the EPDCCH in a CSS on a narrowband resource of the selected EPDCCH.

A network determines configuration of a CSS in an EPDCCH on one or more EPDCCH resources, sends, on the predefined narrowband resource, a message carrying the determined configuration information of the CSS in the EPDCCH, and sends the EPDCCH in the CSS in the EPDCCH on the selected one or more EPDCCH narrowband resources, so that the user equipment may listen to the EPDCCH in the CSS in the EPDCCH on the same selected EPDCCH narrowband resource.

It should be noted that, the user equipment and the network need to determine the selected EPDCCH narrowband resource according to a same rule, to ensure that the narrowband resource on which the user equipment listens to the EPDCCH is the same as the narrowband resource on which the network sends the EPDCCH.

In addition, optionally, the configuration information of the CSS in the EPDCCH may be configuration information of a USS in the EPDCCH, and this example is not listed.

Solution 3. The configuration information sending module 910 sends a fourth physical downlink control channel on the predefined resource, where the fourth physical downlink control channel carries the configuration information of the first physical downlink control channel. Similarly, the "carrying" herein may also refer to "including".

Alternatively, the configuration information sending module 910 sends the fourth physical downlink control channel on the predefined resource, and sends, according to the fourth physical downlink control channel, a message carrying the configuration information of the first physical downlink control channel. The message carrying the configuration information of the first physical downlink control channel may be a common message, or a user equipment specific message.

Optionally, the fourth physical downlink control channel in this solution may be a physical downlink control channel used to schedule a random access contention resolution message. That is, the configuration information sending module 910 sends, on the predefined resource, the fourth physical downlink control channel used to schedule the random access contention resolution message, receives the random access contention resolution message according to the fourth physical downlink control channel, and adds the configuration information of the first physical downlink control channel to the random access contention resolution message. Similarly, in this solution, a manner of transmitting a channel and a message before the fourth physical downlink control channel is not limited, and a manner of determining the predefined resource is not limited. For example, information about the predefined resource is determined in a manner of notification by using a system message or a random access response message, or in a manner of determining by using a pre-known rule.

In an optional example, an implementation scenario of this solution may be as follows.

The configuration information sending module 910 sends a fourth EPDCCH channel on a predefined narrowband resource. Configuration information of a CSS on a physical downlink control channel resource of the fourth EPDCCH is pre-known, that is, the base station device and the user equipment already pre-know the configuration information of the CSS on the physical downlink control channel resource of the fourth EPDCCH, for example, a location of a PRB of the CSS, and/or a size of the PRB, and/or a starting symbol location, and/or a transmission manner (for example, a centralized manner or a distributed manner), and/or a subframe mode.

The user equipment receives the fourth EPDCCH channel on the predefined narrowband resource, and obtains the configuration information of the first physical downlink control channel from the received fourth EPDCCH channel; or receives, by using the received fourth EPDCCH channel, a message carrying the configuration information of the first physical downlink control channel.

A network sends the fourth EPDCCH channel on the predefined resource, and adds the configuration information of the first physical downlink control channel to the fourth physical downlink control channel; or sends, according to the fourth physical downlink control channel, a message carrying the configuration information of the first physical downlink control channel.

Especially, in the foregoing solution 1, solution 2, and solution 3, the predefined resource may be a resource pre-stipulated in a system or standard, or may be a resource notified by using signaling. The signaling is one or more of RRC common signaling, RRC dedicated signaling, Medium Access Control (MAC) signaling, a MAC control element, a physical control channel, or control information.

The predefined resource may be determined in the following three manners.

Manner 1. The predefined resource is determined by using a preset rule. Optionally, the predefined resource is determined according to a quantity of physical resource blocks in the predefined resource, and the predefined resource includes one or more physical resource blocks. For example, an index of a starting PRB or an ending PRB of the predefined resource is a function of n. In an embodiment, assuming that in solution 1, n PRBs are used to send an RAR message, or in solution 2, n PRBs are used to send configuration information of a CSS in an EPDCCH, or in solution 3, a CSS in an EPDCCH includes n PRB resources, the index of the starting PRB or the ending PRB of the predefined resource is an integer multiple of n. In another embodiment, the index of the starting PRB or the ending PRB of the predefined resource is an integer multiple of n plus or minus a preset compensation value. Further, if there are multiple predefined resources, for example, 2 or 4, in PRBs starting from a PRB whose index is an integer multiple of 2, information is transmitted only according to a quantity of resources being 2, and in PRBs starting from a PRB whose index is an integer multiple of 4, information is transmitted only according to a quantity of resources being 4. It should be noted that, the predefined resource may be determined uniquely in a specific moment, for example, a predefined resource whose PRB is 2 or 4 may be determined uniquely.

Manner 2. The predefined resource is notified by using higher-layer signaling. For example, many predefined resources are configured in a higher layer, and are notified to the user equipment by using a PBCH channel. It should be noted that, the predefined resource is certain in a specific moment, and related configuration information may be certain and known.

Manner 3. One or more resources are configured by using higher-layer signaling, and the predefined resource is determined from the one or more resources by using a predefined rule. That is, the foregoing manner 1 and manner 2 are combined. A range is determined by using higher-layer signaling, and a specific resource or some specific resources are determined from the range according to a rule.

The control channel sending module 920 is configured to send the first physical downlink control channel according to the configuration information of the first physical downlink control channel.

Specifically, the control channel sending module 920 determines a sending parameter according to the configuration information of the first physical downlink control channel, and sends the first physical downlink control channel according to the sending parameter, so that the user equipment receives the first physical downlink control channel.

It should be noted that, if the configuration information of the first physical downlink control channel is predefined, the configuration information sending module 910 does not need to send the configuration information of the first physical downlink control channel, and may send the first physical downlink control channel on the predefined resource.

That "the configuration information of the first physical downlink control channel is predefined" includes that "a part of the configuration information of the first physical downlink control channel is predefined, and a part is configured". That is, the configuration information of the first physical downlink control channel includes first configuration information and second configuration information, the first configuration information and the second configuration information include one or more parameter configurations of the first physical downlink control channel, the first configuration information is predefined, and the second configuration information is configured.

In an optional specific implementation manner:

The random access response message carries the first configuration information of the first physical downlink control channel. Alternatively, the second physical downlink control channel carries the first configuration information of the first physical downlink control channel. For example, the second physical downlink control channel is a control channel used to schedule the random access response message.

The second configuration information of the first physical downlink control channel is predefined in the system or standard. Alternatively, system information carries the second configuration information of the first physical downlink control channel.

Figure 10:
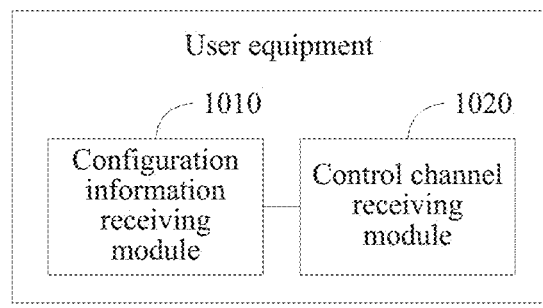
FIG. 10 is a schematic structural diagram of user equipment according to an embodiment of the present disclosure.

FIG. 10 is a schematic structural diagram of user equipment according to an embodiment of the present disclosure. As shown in the figure, the user equipment in this embodiment of the present disclosure may include at least a configuration information receiving module 1010 and a control channel receiving module 1020.

The configuration information receiving module 1010 is configured to receive configuration information of a first physical downlink control channel on a predefined resource, where the configuration information of the first physical downlink control channel is used to indicate manners of sending and receiving the first physical downlink control channel.

The predefined resource may be one or more time frequency resources, but is not limited to the time frequency resource. For example, the predefined resource may be a code domain resource, and/or a spatial resource. It should be noted that, this embodiment of the present disclosure is described by using a time frequency resource as an example.

The predefined resource is a part of a predefined narrowband resource, and a physical downlink control channel is a part of the predefined resource on the predefined narrowband resource, or is a part of the predefined resource on another narrowband resource that is not predefined. In an optional embodiment, referring to a schematic diagram, shown in FIG. 13, of a frequency band resource, a relationship among the predefined narrowband resource, another narrowband resource that is not predefined, and the physical downlink control channel is shown in the figure. Predefining refers to: A base station device and the user equipment already predefine configuration information, for example, a location of a resource used for transmission and a quantity of resources used for transmission, and a scrambling sequence used for transmission. It should be understood that the predefined resource and the predefined narrowband resource respectively are a resource whose configuration information is already predefined and a narrowband resource whose configuration information is already predefined.

The physical downlink control channel is a control channel carrying scheduling information. For example, the physical downlink control channel in this embodiment of the present disclosure includes one or more of a PDCCH, an EPDCCH, an RPDCCH, or the like, and especially, refers to an EPDCCH. The method in the present disclosure is described by using an example in which the physical downlink control channel is an EPDCCH. In addition, configuration information of the physical downlink control channel may indicate a transmission manner of the physical downlink control channel, or a manner of transmitting data of the physical downlink control channel on the physical downlink control channel, for example, a location of a resource used for transmission and a quantity of resources used for transmission, a scrambling sequence used for transmission, and configuration of an uplink control channel (PUCCH).

Further, the configuration information of the physical downlink control channel includes configuration information of a common search space (that is, "CSS") in the physical downlink control channel, and/or configuration information of a user equipment specific search space (that is, "USS") in the physical downlink control channel. The physical downlink control channel especially refers to the first physical downlink control channel and a third physical downlink control channel. For example, the configuration information of the first physical downlink control channel includes configuration information of a CSS and/or configuration information of a USS in the first physical downlink control channel, and configuration information of the third physical downlink control channel includes configuration information of a CSS and/or configuration information of a USS in the third physical downlink control channel.

Specifically, the configuration information receiving module 1010 receives the configuration information of the first physical downlink control channel on the predefined resource. The manner of receiving, by the configuration information receiving module 1010, the first physical downlink control channel may be, for example, a location of a resource used to receive the first physical downlink control channel and a quantity of resources used to receive the first physical downlink control channel, and/or a used scrambling sequence, and/or a used uplink control channel resource.

Further, the predefined resource may be a part or all of a physical downlink control channel resource. The physical downlink control channel resource is a set of a resource to which the physical downlink control channel is mapped, and a quantity of the physical downlink control channel resources is one or more. It should be noted that, that "the physical downlink control channel resource is a set of a resource to which the physical downlink control channel is mapped" refers to that "the physical downlink control channel resource is a set of a resource to which the physical downlink control channel may be mapped". For example, the predefined resource is a part of a CSS resource of a pre-known physical downlink control channel. In this embodiment of the present disclosure, other configuration information of a physical downlink control channel resource of the CSS (for example, configuration information of all CSSs in the physical downlink control channel of the CSS, or configuration information of a USS in the physical downlink control channel of the CSS) may be received by using the predefined resource. Furthermore, if one or more physical downlink control channel resources are defined in a communications system, the configuration information of the physical downlink control channel may be used to configure a physical downlink control channel on the one or more physical downlink control channel resources. For example, the predefined resource is a part or all of a CSS resource of a pre-known physical downlink control channel resource. In this embodiment of the present disclosure, physical downlink control channel configuration of one or more physical downlink control channel resources other than the pre-known physical downlink control channel resource may be received on the predefined resource.

Based on the foregoing description, in a specific implementation process, a specific implementation manner of receiving, by the configuration information receiving module 1010, the configuration information of the first physical downlink control channel on the predefined resource may be implemented by using the following three solutions.

Solution 1: The configuration information receiving module 1010 receives a random access response message on the predefined resource, where the random access response message carries the configuration information of the first physical downlink control channel. The "carrying" herein may refer to "including", that is, the random access response message includes the configuration information of the first physical downlink control channel.

Alternatively, the configuration information receiving module 1010 receives scheduling information of the random access response message on the predefined resource, where the scheduling information of the random access response message is used to indicate manners of sending and receiving the random access response message; and receives the random access response message according to the scheduling information of the random access response message, and obtains the configuration information of the first physical downlink control channel carried in the random access response message. It should be noted that the manner of receiving, by the configuration information receiving module 1010, the random access response message may be, for example, a location of a resource block used to receive the random access response message and a quantity of resource blocks used to receive the random access response message, and/or a used modulation and coding scheme. Further, a specific operation of "receiving, by the configuration information receiving module 1010, the scheduling information of the random access response message on the predefined resource" may be: first determining, by the configuration information receiving module 1010, a common search space on the predefined resource; then, receiving, in the common search space, a second physical downlink control channel used to schedule the random access response message, where the second physical downlink control channel carries the scheduling information of the random access response message. Similarly, the "carrying" herein may also refer to "including".

In the foregoing description, the random access response message is an RAR (Random Access Response) message, and how to send a common message before the RAR is not limited in this embodiment of the present disclosure. For example, how to send a public broadcast channel (PBCH) and a system message (SIB1 (System Information Block), or SI) before the RAR is not limited in the present disclosure. Certainly, the common message before the RAR may be used to configure the predefined resource.

Optionally, the configuration information receiving module 1010 may implement, by using the following method, an operation of "receiving the random access response message, and obtaining the configuration information of the first physical downlink control channel carried in the random access response message": receiving, by the configuration information receiving module 1010, the random access response message, and obtaining indication information carried in the random access response message, where the indication information includes the configuration information of the first physical downlink control channel. In an optional implementation manner, the first physical downlink control channel is used to schedule a random access contention resolution message Msg4, that is, the indication information carried in the random access response message includes configuration information of a physical downlink control channel of the random access contention resolution message Msg4.

Further, optionally, the configuration information receiving module 1010 may implement, by using the following two manners, an operation of "receiving the random access response message, and obtaining the configuration information of the first physical downlink control channel carried in the random access response message". 1. The configuration information receiving module 1010 receives the random access response message, and obtains indication information carried in the random access response message, where the indication information includes scheduling information of a random access contention resolution message, and the scheduling information of the random access contention resolution message is used to indicate manners of sending and receiving the random access contention resolution message; and receives the random access contention resolution message, where the random access contention resolution message carries the configuration information of the first physical downlink control channel. Similarly, the "carrying" herein may also refer to "including". 2. The configuration information receiving module 1010 receives the random access response message, and obtains indication information carried in the random access response message, where the indication information includes configuration information of a third physical downlink control channel, the configuration information of the third physical downlink control channel is used to indicate manners of sending and receiving the third physical downlink control channel, the third physical downlink control channel is used to transmit scheduling information of a random access contention resolution message, the scheduling information of the random access contention resolution message is used to indicate manners of sending and receiving the random access contention resolution message, and the configuration information of the third physical downlink control channel includes configuration information of a common search space in the third physical downlink control channel, and/or configuration information of a user equipment specific search space in a physical downlink control resource of the third physical downlink control channel; and receives the random access contention resolution message according to the scheduling information of the random access contention resolution message, and obtains the configuration information of the first physical downlink control channel carried in the random access contention resolution message.

In the foregoing description, the random access contention resolution message may be an MSG4. The MSG4 may be used to resolve a problem of conflicts in a random access process caused by the fact that the user equipment selects a same random access resource, for example, the user equipment chooses to receive a same random access preamble sequence on a same time frequency resource. It should be noted that, a difference from this embodiment of the present disclosure lies in: According to an existing protocol, the RAR message carries only scheduling information of an MSG3 (that is, a random access procedure message 3), and does not carry scheduling information of the MSG4 or a third physical downlink control channel used to transmit scheduling information of the MSG4.

Further optionally, the base station device may implement, by using the following two manners, an operation of "adding the indication information to the random access response message". 1. The base station device adds a new field to the random access response message, where the new field includes the indication information. 2. The base station device re-explains an existing field in the random access response message, and adds the indication information to the existing field that is re-explained. The re-explaining an existing field is: Re-define usage of some bits of the existing field. In an optional example, referring to a schematic diagram, shown in FIG. 14, of fields of the random access response message, as shown in the figure, a UL Grant field is used to schedule the MSG3, and the field occupies a capacity of 20 bits. However, in a scenario of a narrowband resource, fewer bits than 20 bits are needed to schedule the MSG3. In this embodiment of the present disclosure, the field may be re-explained, only several bits are used to schedule the MSG3, and the remaining bits are used to transmit the indication information.

Similarly, optionally, the base station device may implement, by using the following two manners, an operation of adding the configuration information of the first physical downlink control channel to the random access response message. 1. The base station device adds a new field to the random access response message, where the new field includes the configuration information of the first physical downlink control channel. 2. The base station device re-explains an existing field of the random access response message, and writes the configuration information of the first physical downlink control channel into the existing field that is re-explained.

Solution 2. The configuration information receiving module 1010 receives, on the predefined resource, a data channel carrying the configuration information of the first physical downlink control channel. The data channel is received in an unscheduled manner. It should be noted that the existing data channel is received in a scheduled manner. In this embodiment of the present disclosure, the scheduled manner is not used, for example, a pre-known modulation and coding scheme or a manner without feedback is used.

It should be noted that receiving a data channel refers to receiving data of the data channel on the data channel.

Optionally, the data channel in this solution may be a random access contention resolution message. That is, the configuration information receiving module 1010 receives the random access contention resolution message on the predefined resource, and obtains the configuration information of the first physical downlink control channel carried in the random access contention resolution message. In this embodiment, a method for transmitting a message before the random access contention resolution message is not limited, and a manner of determining the predefined resource is not limited. For example, information about the predefined resource is determined in a manner of notification by using a system message or a random access response message, or in a manner of determining by using a pre-known rule.

In an optional example, an implementation scenario of this solution may be as follows.

The base station device sends, on a predefined narrowband resource, a message carrying configuration information of an EPDCCH. A manner of sending the message carrying the configuration information of the EPDCCH may be a modulation and coding scheme. The configuration information of the EPDCCH may be configuration information of a CSS in the EPDCCH on one or more EPDCCH resources, for example, on the predefined narrowband resource, or may be configuration information of a CSS in an EPDCCH on another narrowband resource. The configuration information of the CSS may be, for example, a location of a PRB of the CSS, and/or a size of the PRB, and/or a starting symbol location, and/or a transmission manner (for example, a centralized manner or a distributed manner), and/or a subframe mode.

The configuration information receiving module 1010 receives, on the predefined narrowband resource, the message carrying the configuration information of the CSS in the EPDCCH, obtains the configuration information of the CSS in the EPDCCH according to the received message, and listens to the EPDCCH in a CSS on a narrowband resource of the selected EPDCCH.

A network determines configuration of a CSS in an EPDCCH on one or more EPDCCH resources, sends, on the predefined narrowband resource, a message carrying the determined configuration information of the CSS in the EPDCCH, and sends the EPDCCH in the CSS in the EPDCCH on the selected one or more EPDCCH narrowband resources, so that the user equipment may listen to the EPDCCH in the CSS in the EPDCCH on the same selected EPDCCH narrowband resource.

It should be noted that, the configuration information receiving module 1010 and the network need to determine the selected EPDCCH narrowband resource according to a same rule, to ensure that the narrowband resource on which the configuration information receiving module 1010 listens to the EPDCCH is the same as the narrowband resource on which the network sends the EPDCCH.

In addition, optionally, the configuration information of the CSS in the EPDCCH may be configuration information of a USS in the EPDCCH, and this example is not listed.

Solution 3. The configuration information receiving module 1010 receives a fourth physical downlink control channel on the predefined resource, where the fourth physical downlink control channel carries the configuration information of the first physical downlink control channel. Similarly, the "carrying" herein may also refer to "including".

Alternatively, the configuration information receiving module 1010 receives the fourth physical downlink control channel on the predefined resource, and receives, according to the fourth physical downlink control channel, a message carrying the configuration information of the first physical downlink control channel. The message carrying the configuration information of the first physical downlink control channel may be a common message, or a user equipment specific message.

Optionally, the fourth physical downlink control channel in this solution may be a physical downlink control channel used to schedule a random access contention resolution message. That is, the configuration information receiving module 1010 receives, on the predefined resource, the fourth physical downlink control channel used to schedule the random access contention resolution message, receives the random access contention resolution message according to the fourth physical downlink control channel, and adds the configuration information of the first physical downlink control channel to the random access contention resolution message. Similarly, in this solution, a manner of transmitting a channel and a message before the fourth physical downlink control channel is not limited, and a manner of determining the predefined resource is not limited. For example, information about the predefined resource is determined in a manner of notification by using a system message or a random access response message, or in a manner of determining by using a pre-known rule.

In an optional example, an implementation scenario of this solution may be as follows.

The base station device sends a fourth EPDCCH channel on a predefined narrowband resource. Configuration information of a CSS on a physical downlink control channel resource of the fourth EPDCCH is pre-known, that is, the base station device and the user equipment already pre-know the configuration information of the CSS on the physical downlink control channel resource of the fourth EPDCCH, for example, a location of a PRB of the CSS, and/or a size of the PRB, and/or a starting symbol location, and/or a transmission manner (for example, a centralized manner or a distributed manner), and/or a subframe mode.

The configuration information receiving module 1010 receives the fourth EPDCCH channel on the predefined narrowband resource, and obtains the configuration information of the first physical downlink control channel from the received fourth EPDCCH channel; or receives, by using the received fourth EPDCCH channel, a message carrying the configuration information of the first physical downlink control channel.

A network sends the fourth EPDCCH channel on the predefined resource, and adds the configuration information of the first physical downlink control channel to the fourth physical downlink control channel; or sends, according to the fourth physical downlink control channel, a message carrying the configuration information of the first physical downlink control channel.

Especially, in the foregoing solution 1, solution 2, and solution 3, the predefined resource may be a resource pre-stipulated in a system or standard, or may be a resource notified by using signaling. The signaling is one or more of RRC common signaling, RRC dedicated signaling, Medium Access Control (MAC) signaling, a MAC control element, a physical control channel, or control information.

The predefined resource may be determined in the following three manners.

Manner 1. The predefined resource is determined by using a preset rule. Optionally, the predefined resource is determined according to a quantity of physical resource blocks in the predefined resource, and the predefined resource includes one or more physical resource blocks. For example, an index of a starting PRB or an ending PRB of the predefined resource is a function of n. In an embodiment, assuming that in solution 1, n PRBs are used to receive an RAR message, or in solution 2, n PRBs are used to receive configuration information of a CSS in an EPDCCH, or in solution 3, a CSS in an EPDCCH includes n PRB resources, the index of the starting PRB or the ending PRB of the predefined resource is an integer multiple of n. In another embodiment, the index of the starting PRB or the ending PRB of the predefined resource is an integer multiple of n plus or minus a preset compensation value. Further, if there are multiple predefined resources, for example, 2 or 4, in PRBs starting from a PRB whose index is an integer multiple of 2, information is transmitted only according to a quantity of resources being 2, and in PRBs starting from a PRB whose index is an integer multiple of 4, information is transmitted only according to a quantity of resources being 4. It should be noted that, the predefined resource may be determined uniquely in a specific moment, for example, a predefined resource whose PRB is 2 or 4 may be determined uniquely.

Manner 2. The predefined resource is notified by using higher-layer signaling. For example, many predefined resources are configured in a higher layer, and are notified to the user equipment by using a PBCH channel. It should be noted that, the predefined resource is certain in a specific moment, and related configuration information may be certain and known.

Manner 3. One or more resources are configured by using higher-layer signaling, and the predefined resource is determined from the one or more resources by using a predefined rule. That is, the foregoing manner 1 and manner 2 are combined. A range is determined by using higher-layer signaling, and a specific resource or some specific resources are determined from the range according to a rule.

The control channel receiving module 1020 is configured to receive the first physical downlink control channel according to the configuration information of the first physical downlink control channel.

Specifically, the control channel receiving module 1020 determines a receiving parameter according to the configuration information of the first physical downlink control channel, and receives the first physical downlink control channel according to the receiving parameter.

Figure 11:
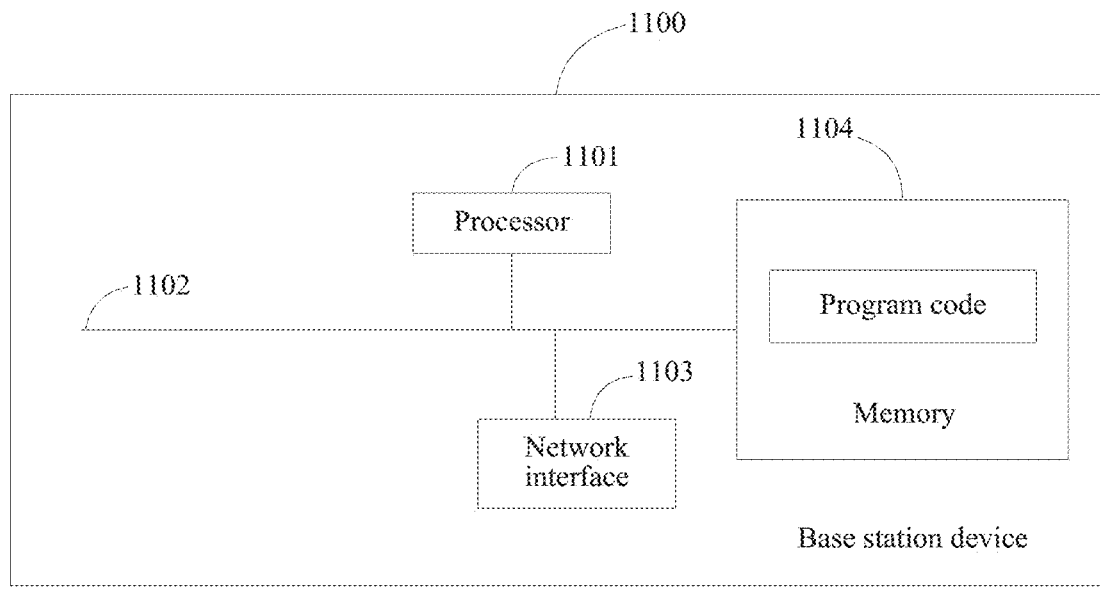
FIG. 11 is a schematic structural diagram of another base station device according to an embodiment of the present disclosure.

FIG. 11 is a schematic structural diagram of another base station device according to an embodiment of the present disclosure. As shown in FIG. 11, the base station device may include at least one processor 1101, for example, a CPU, at least one network interface 1103, a memory 1104, and at least one communications bus 1102. The communications bus 1102 is configured to implement connection and communication between the components. The network interface 1103 in the base station device in this embodiment of the present disclosure may be a wireless interface, for example, an antenna apparatus, configured to perform signaling or data communication with another node device. The memory 1104 may be a high-speed RAM memory, or may be a non-volatile memory (non-volatile memory), such as at least one magnetic disk memory. Optionally, the memory 1104 may also be at least one storage device located away from the processor 1101. The memory 1104 stores a group of program code, and the processor 1101 is configured to invoke the program code stored in the memory 1104, to perform the following operations:

sending configuration information of a first physical downlink control channel on a predefined resource, where the configuration information of the first physical downlink control channel is used to indicate manners of sending and receiving the first physical downlink control channel; and sending the first physical downlink control channel according to the configuration information of the first physical downlink control channel.

Specifically, the base station device described in this embodiment may be configured to implement some or all steps in the physical downlink control channel sending method described in the embodiments of the present disclosure with reference to FIG. 1 to FIG. 4.

Figure 12:
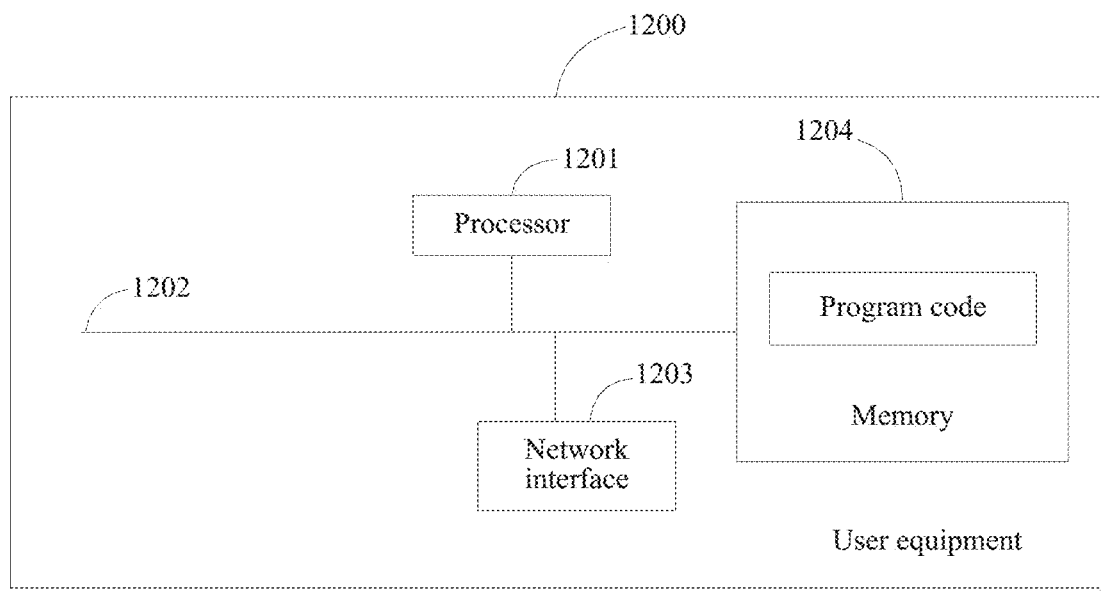
FIG. 12 is a schematic structural diagram of another user equipment according to an embodiment of the present disclosure.

FIG. 12 is a schematic structural diagram of another user equipment according to an embodiment of the present disclosure. As shown in FIG. 12, the user equipment may include at least one processor 1201, for example, a CPU, at least one network interface 1203, a memory 1204, and at least one communications bus 1202. The communications bus 1202 is configured to implement connection and communication between the components. The network interface 1203 in the user equipment in this embodiment of the present disclosure may be a wireless interface, for example, an antenna apparatus, configured to perform signaling or data communication with another node device. The memory 1204 may be a high-speed RAM memory, or may be a non-volatile memory (non-volatile memory), such as at least one magnetic disk memory. Optionally, the memory 1204 may also be at least one storage device located away from the processor 1201. The memory 1204 stores a group of program code, and the processor 1201 is configured to invoke the program code stored in the memory 1204, to perform the following operations:

receiving configuration information of a first physical downlink control channel on a predefined resource, where the configuration information of the first physical downlink control channel is used to indicate manners of sending and receiving the first physical downlink control channel; and receiving the first physical downlink control channel according to the configuration information of the first physical downlink control channel.

Specifically, the user equipment described in this embodiment may be configured to implement some or all steps in the physical downlink control channel receiving method described in the embodiments of the present disclosure with reference to FIG. 5 to FIG. 8.

An embodiment of the present disclosure further provides a computer storage medium. The computer storage medium stores a program, and the program includes several instructions used to perform some or all steps in the physical downlink control channel sending method described in the embodiments of the present disclosure with reference to FIG. 1 to FIG. 4.

An embodiment of the present disclosure further provides a computer storage medium. The computer storage medium stores a program, and the program includes several instructions used to perform some or all steps in the physical downlink control channel receiving method described in the embodiments of the present disclosure with reference to FIG. 5 to FIG. 8.

As can be seen from the foregoing, in this embodiment of the present disclosure, first, configuration information of a physical downlink control channel is sent on a predefined resource, and the physical downlink control channel is sent according to the configuration information of the physical downlink control channel, thereby implementing sending of a physical downlink control channel, and resolving a problem that when narrowband user equipment works in a system whose system bandwidth is greater than an operating bandwidth of the narrowband user equipment, transmission of a physical downlink control channel cannot be implemented. The physical downlink control channel includes but is not limited to a PDCCH channel and/or an EPDCCH channel.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

What is disclosed above is merely example embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A base station device, comprising:
a processor; and
a memory coupled to the processor and storing programming instructions that, when executed by the processor, cause the base station to:
send a first physical downlink control channel for transmitting scheduling information of a message 4 (Msg4) on a predefined resource;
send the Msg4 carrying configuration information of a second physical downlink control channel according to the scheduling information of the Msg4;
send the second physical downlink control channel according to the configuration information of the second physical downlink control channel.

2. The base station device according to claim 1, wherein the predefined resource is determined by using a preset rule; and/or
notified by using a higher layer; or
one or more resources are configured by using a higher layer, and the predefined resource is determined from the one or more resources by using a predefined rule.

3. The base station device according to claim 1, wherein the predefined resource comprises a predefined time frequency resource.

4. The base station device according to claim 1, wherein the predefined resource is a part of a predefined narrowband resource, and the second physical downlink control channel is a part of the predefined resource on the predefined narrowband resource.

5. A user equipment (UE), comprising:
a processor; and
a memory coupled to the processor and storing programming instructions that, when executed by the processor, cause the UE to:
receive a first physical downlink control channel for transmitting scheduling information of a message 4 (Msg4) on a predefined resource;
receive the Msg4 that is carrying configuration information of a second physical downlink control channel according to the scheduling information of the Msg4;
receive the second physical downlink control channel according to the configuration information of the second physical downlink control channel.

6. The UE according to claim 5, wherein the predefined resource is determined by using a preset rule; and/or
notified by using a higher layer; or
one or more resources are configured by using a higher layer, and the predefined resource is determined from the one or more resources by using a predefined rule.

7. The UE according to claim 5, wherein the predefined resource comprises a predefined time frequency resource.

8. The UE according to claim 5, wherein the predefined resource is a part of a predefined narrowband resource, and the second physical downlink control channel is a part of the predefined resource on the predefined narrowband resource.

9. A base station device, comprising:
a processor; and
a memory coupled to the processor and storing programming instructions that, when executed by the processor, cause the base station to:
send a random access response message on a predefined resource, wherein the random access response message carries indication information comprising configuration information of a first physical downlink control channel, the first physical downlink control channel for transmitting scheduling information of a message 4 (Msg4);
send the Msg4 that is carrying configuration information of a second physical downlink control channel according to the scheduling information of the Msg4;
send the second physical downlink control channel according to the configuration information of the second physical downlink control channel.

10. The base station device according to claim 9, wherein the predefined resource is determined by using a preset rule; and/or
notified by using a higher layer; or
one or more resources are configured by using a higher layer, and the predefined resource is determined from the one or more resources by using a predefined rule.

11. The base station device according to claim 9, wherein the predefined resource comprises a predefined time frequency resource.

12. The base station device according to claim 9, wherein the predefined resource is a part of a predefined narrowband resource, and the second physical downlink control channel is a part of the predefined resource on the predefined narrowband resource.

13. A user equipment (UE), comprising:
a processor; and
a memory coupled to the processor and storing programming instructions that, when executed by the processor, cause the UE to:
receive a random access response message on a predefined resource, wherein the random access response message carries indication information comprising configuration information of a first physical downlink control channel, the first physical downlink control channel for transmitting scheduling information of a message 4 (Msg4);
receive the Msg4 that is carrying configuration information of a second physical downlink control channel according to the scheduling information of the Msg4;
receive the second physical downlink control channel according to the configuration information of the second physical downlink control channel.

14. The UE according to claim 13, wherein the predefined resource is determined by using a preset rule; and/or
notified by using a higher layer; or
one or more resources are configured by using a higher layer, and the predefined resource is determined from the one or more resources by using a predefined rule.

15. The UE according to claim 13, wherein the predefined resource comprises a predefined time frequency resource.

16. The UE according to claim 13, wherein the predefined resource is a part of a predefined narrowband resource, and the second physical downlink control channel is a part of the predefined resource on the predefined narrowband resource.

* * * * *